US011720147B2

(12) United States Patent
Prushinskiy et al.

(10) Patent No.: US 11,720,147 B2
(45) Date of Patent: Aug. 8, 2023

(54) ELECTRONIC DEVICE INCLUDING FLEXIBLE DISPLAY

(71) Applicant: Samsung Electronics Co., Ltd., Gyeonggi-do (KR)

(72) Inventors: Valeriy Prushinskiy, Gyeonggi-do (KR); Hyungsok Yeo, Gyeonggi-do (KR); Changryong Heo, Gyeonggi-do (KR); Minwoo Yoo, Gyeonggi-do (KR); Seonho Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 17/539,325

(22) Filed: Dec. 1, 2021

(65) Prior Publication Data
US 2022/0171433 A1 Jun. 2, 2022

Related U.S. Application Data

(63) Continuation of application No. PCT/KR2021/017858, filed on Nov. 30, 2021.

(30) Foreign Application Priority Data

Dec. 1, 2020 (KR) ........................ 10-2020-0166043
Mar. 5, 2021 (KR) ........................ 10-2021-0029612

(51) Int. Cl.
*G06F 1/16* (2006.01)

(52) U.S. Cl.
CPC .......... *G06F 1/1652* (2013.01); *G06F 1/1607* (2013.01); *G06F 1/1624* (2013.01); *G06F 2200/1632* (2013.01)

(58) Field of Classification Search
CPC ..... G06F 1/1607; G06F 1/1624; G06F 1/1652
See application file for complete search history.

(56) References Cited

U.S. PATENT DOCUMENTS 6,016,176 A * 1/2000 Kim ........................ G09F 9/301
349/158
7,639,237 B2 * 12/2009 Perkins ................... G09F 9/301
345/173

(Continued)

FOREIGN PATENT DOCUMENTS

JP 2006-287982 A 10/2006
JP 6773272 B1 10/2020

(Continued)

OTHER PUBLICATIONS

International Search Report dated Mar. 23, 2022.

*Primary Examiner* — Adrian S Wilson
(74) *Attorney, Agent, or Firm* — Cha & Reiter, LLC

(57) ABSTRACT

An electronic device according to an embodiment includes a first housing, a second housing coupled to the first housing to slide in a first direction, and a display including a first area having one end coupled to one side of the first housing so as to be rotatable about an axis of rotation that faces in a second direction crossing the first direction and a second area adjacent to an opposite end of the first area. In a first state, the second housing is located in the first housing, one region of the second area of the display is folded toward a rear surface of the display, the display in a folded state is disposed on one surface of the first housing, and the first area of the display is visually exposed. In a second state, the display is unfolded such that the first area and the second area are visually exposed, and at least part of the second housing is withdrawn from the first housing and disposed on a rear surface of the second area of the display.

20 Claims, 21 Drawing Sheets

(56) References Cited

U.S. PATENT DOCUMENTS

| | | | | |
|---|---|---|---|---|
| 7,830,333 B2* | 11/2010 | Aoki | H04M 1/0268 345/1.3 |
| 8,018,715 B2* | 9/2011 | Chang | G06F 1/1647 361/679.04 |
| 8,174,628 B2* | 5/2012 | Matsushita | G09G 3/3406 348/836 |
| 8,369,075 B2* | 2/2013 | Huang | G09F 9/301 345/173 |
| 8,379,377 B2* | 2/2013 | Walters | G06F 1/1641 361/679.04 |
| 8,380,327 B2* | 2/2013 | Park | G09F 9/301 361/679.01 |
| 8,493,714 B2* | 7/2013 | Visser | G06F 1/1613 361/679.01 |
| 8,493,726 B2* | 7/2013 | Visser | G06F 1/1601 361/679.05 |
| 8,711,566 B2* | 4/2014 | O'Brien | G06F 1/1652 361/724 |
| 8,787,008 B2* | 7/2014 | Walters | G06F 1/1624 361/679.04 |
| 8,873,225 B2 | 10/2014 | Huitema et al. | |
| 8,971,034 B2* | 3/2015 | Verschoor | G06F 1/1652 361/679.55 |
| 9,560,750 B2* | 1/2017 | Lee | G06F 1/1652 |
| 9,823,697 B2* | 11/2017 | Hsu | G06F 1/1624 |
| D819,630 S * | 6/2018 | Prushinskiy | D14/345 |
| 10,082,833 B2* | 9/2018 | Chen | G06F 1/1652 |
| 10,152,086 B2* | 12/2018 | Choi | G09F 9/301 |
| 10,488,959 B2* | 11/2019 | Aurongzeb | G06F 1/1679 |
| D871,397 S * | 12/2019 | Seo | G06F 1/1652 D14/341 |
| 10,664,013 B2* | 5/2020 | Jiang | G06F 1/1641 |
| 10,782,739 B2 | 9/2020 | Ou et al. | |
| 10,812,637 B2 | 10/2020 | Jung et al. | |
| 10,817,022 B2* | 10/2020 | Cho | G06F 3/0487 |
| 10,868,264 B2* | 12/2020 | Shin | G06F 1/1601 |
| 10,881,009 B2* | 12/2020 | Jiang | H05K 5/0017 |
| D913,282 S * | 3/2021 | Song | D14/371 |
| 11,056,025 B2* | 7/2021 | Lee | G09G 3/20 |
| 11,093,007 B2 | 8/2021 | Lim | |
| 11,140,246 B2 | 10/2021 | Lee | |
| 11,178,264 B2* | 11/2021 | Kim | H04M 1/0268 |
| 11,315,443 B2* | 4/2022 | Han | G06F 1/1652 |
| 2006/0038745 A1* | 2/2006 | Naksen | G06F 1/1624 257/40 |
| 2006/0082518 A1* | 4/2006 | Ram | G06F 1/1635 345/1.1 |
| 2006/0192726 A1* | 8/2006 | Huitema | G06F 1/1679 345/1.1 |
| 2007/0004475 A1* | 1/2007 | Kuo | H04M 1/0268 455/575.3 |
| 2007/0247798 A1* | 10/2007 | Scott, II | G06F 1/1647 361/679.04 |
| 2008/0158795 A1* | 7/2008 | Aoki | H04M 1/0268 361/679.27 |
| 2010/0037428 A1* | 2/2010 | Gaddy | H04M 1/0247 16/366 |
| 2010/0182738 A1* | 7/2010 | Visser | H04M 1/0268 361/679.01 |
| 2010/0201604 A1* | 8/2010 | Kee | G06F 1/1616 345/1.3 |
| 2011/0148797 A1 | 6/2011 | Huitema et al. | |
| 2011/0188189 A1* | 8/2011 | Park | G06F 1/1652 361/679.05 |
| 2012/0162876 A1* | 6/2012 | Kim | G06F 1/1652 361/679.01 |
| 2012/0212433 A1* | 8/2012 | Lee | G06F 1/1643 345/173 |
| 2012/0314399 A1* | 12/2012 | Bohn | H04M 1/0268 361/679.01 |
| 2012/0314400 A1* | 12/2012 | Bohn | H04M 1/0237 361/679.01 |
| 2013/0058063 A1* | 3/2013 | O'Brien | G06F 1/1624 361/807 |
| 2013/0128439 A1* | 5/2013 | Walters | G06F 1/1624 361/679.04 |
| 2014/0011548 A1* | 1/2014 | Varela | G06F 1/1681 455/566 |
| 2015/0022436 A1* | 1/2015 | Cho | G06F 1/1615 345/156 |
| 2015/0338888 A1 | 11/2015 | Kim et al. | |
| 2017/0140504 A1* | 5/2017 | Jeong | G06F 1/1677 |
| 2018/0077808 A1* | 3/2018 | Seo | G06F 3/044 |
| 2018/0081473 A1* | 3/2018 | Seo | G06F 1/3287 |
| 2018/0103132 A1* | 4/2018 | Prushinskiy | G06F 1/1643 |
| 2019/0146558 A1* | 5/2019 | Ohata | G09G 5/00 361/679.21 |
| 2019/0384438 A1* | 12/2019 | Park | G06F 3/0482 |
| 2020/0133341 A1 | 4/2020 | Ou et al. | |
| 2020/0152095 A1* | 5/2020 | Lee | G06F 3/147 |
| 2020/0159287 A1* | 5/2020 | Jeong | H10K 50/865 |
| 2020/0192432 A1* | 6/2020 | Yee | G06F 1/1675 |
| 2020/0233465 A1 | 7/2020 | Lim | |
| 2020/0264660 A1* | 8/2020 | Song | H04M 1/0237 |
| 2020/0344337 A1 | 10/2020 | Lee | |
| 2020/0366770 A1* | 11/2020 | Kim | H04M 1/0241 |
| 2020/0371553 A1* | 11/2020 | Hsu | G06F 1/1624 |
| 2020/0394940 A1* | 12/2020 | Thompson | G09F 7/10 |
| 2021/0076517 A1* | 3/2021 | Wang | H05K 5/0217 |
| 2021/0328160 A1* | 10/2021 | Feng | H10K 50/84 |
| 2021/0333836 A1 | 10/2021 | Lim | |
| 2021/0383727 A1* | 12/2021 | Han | G06F 1/1624 |
| 2022/0075426 A1 | 3/2022 | Oh | |
| 2022/0129041 A1 | 4/2022 | Kim et al. | |

FOREIGN PATENT DOCUMENTS

| | | |
|---|---|---|
| KR | 10-1831175 B1 | 2/2018 |
| KR | 10-1837568 B1 | 3/2018 |
| KR | 10-2027089 B1 | 9/2019 |
| KR | 10-2020-0037727 A | 4/2020 |
| KR | 10-2020-0067567 A | 6/2020 |
| KR | 10-2020-0079956 A | 7/2020 |
| KR | 10-2020-0105354 A | 9/2020 |
| KR | 10-2022-0017203 A | 2/2022 |
| KR | 10-2022-0050404 A | 4/2022 |

* cited by examiner

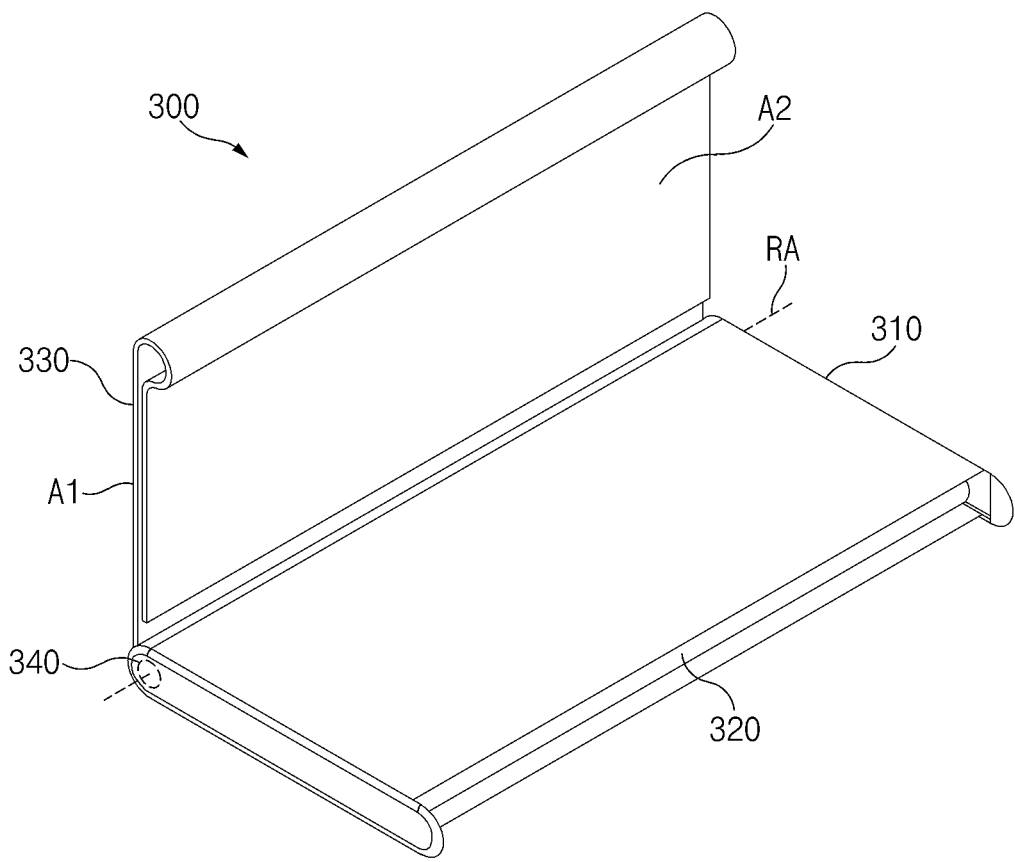
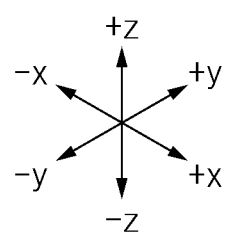
FIG.4

ELECTRONIC DEVICE INCLUDING FLEXIBLE DISPLAY

CROSS REFERENCE TO RELATED APPLICATION

This application is a continuation of International Application No. PCT/KR2021/017858 designating the United States, filed on Nov. 30, 2021, in the Korean Intellectual Property Receiving Office and claiming priority to Korean Application Serial No. 10-2020-0166043, which was filed in the Korean Intellectual Property Office on Dec. 1, 2020, and Korean Patent Application Serial No. 10-2021-0029612, which was filed in the Korean Intellectual Property Office on Mar. 5, 2021, the entire content of which is hereby incorporated by reference.

TECHNICAL FIELD

Embodiments of the disclosure described herein relate to an electronic device including a flexible display.

BACKGROUND

An electronic device may include a flexible display. For example, the flexible display may be disposed in the electronic device in a form in which at least one area is curved, foldable, or rollable. The flexible display may be folded in an in-folding manner such that a display area faces inward, or may be folded in an out-folding manner such that the display area faces outward.

The display may get damaged by an external impact when the entire display area of the display is located on the outside of the electronic device and the electronic device is folded in an out-folding manner.

Accordingly, it is important protect a screen of electronic device.

SUMMARY

An electronic device according to an embodiment includes a first housing, a second housing coupled to the first housing to slide in a first direction, and a display including a first area having one end coupled to one side of the first housing so as to be rotatable about an axis of rotation that faces in a second direction crossing the first direction and a second area adjacent to an opposite end of the first area. In a first state, the second housing is located in the first housing, one region of the second area of the display is folded toward a rear surface of the display, the display in a folded state is disposed on one surface of the first housing, and the first area of the display is visually exposed. In a second state, the display is unfolded such that the first area and the second area are visually exposed, and at least part of the second housing is withdrawn from the first housing and disposed on a rear surface of the second area of the display.

An electronic device according to an embodiment includes a first housing including a front plate, a back plate, and an opening located in one side surface of the first housing, a second housing that slides in a first direction through the opening of the first housing so as to be at least partially withdrawn from the first housing and slides in a direction opposite to the first direction through the opening of the first housing so as to be inserted into the first housing, and a display including a first area and a second area adjacent to each other. The first area has one end coupled to one side of the first housing so as to be rotatable about an axis of rotation facing in a second direction crossing the first direction and is disposed on the first housing such that in one state, a rear surface of the first area faces the front plate. The second area is adjacent to an opposite end of the first area, and one region of the second area is folded toward a rear surface of the display such that at least part of the second area is located between the front plate and the first area, or the one region is unfolded such that the second area is disposed on the second housing withdrawn from the first housing.

DESCRIPTION OF DRAWINGS

FIG. 4 is a perspective view illustrating the electronic device in an intermediate state.

With regard to description of the drawings, identical or similar reference numerals may be used to refer to identical or similar components.

DETAILED DESCRIPTION

Embodiments of the disclosure provide an out-folding type electronic device having improved durability.

Furthermore, embodiments of the disclosure provide an electronic device in which stress caused by bending of a display is reduced.

According to the embodiments, the durability of the electronic device may be improved.

Furthermore, according to the embodiments, stress caused by bending of the display in the electronic device may be reduced.

In addition, the disclosure may provide various effects that are directly or indirectly recognized.

Hereinafter, certain embodiments of the disclosure may be described with reference to accompanying drawings. However, those of ordinary skill in the art will understand that the disclosure is not limited to a specific embodiment, and modifications, equivalents, and/or alternatives on the certain embodiments described herein can be variously made without departing from the scope and spirit of the disclosure.

Figure 1:
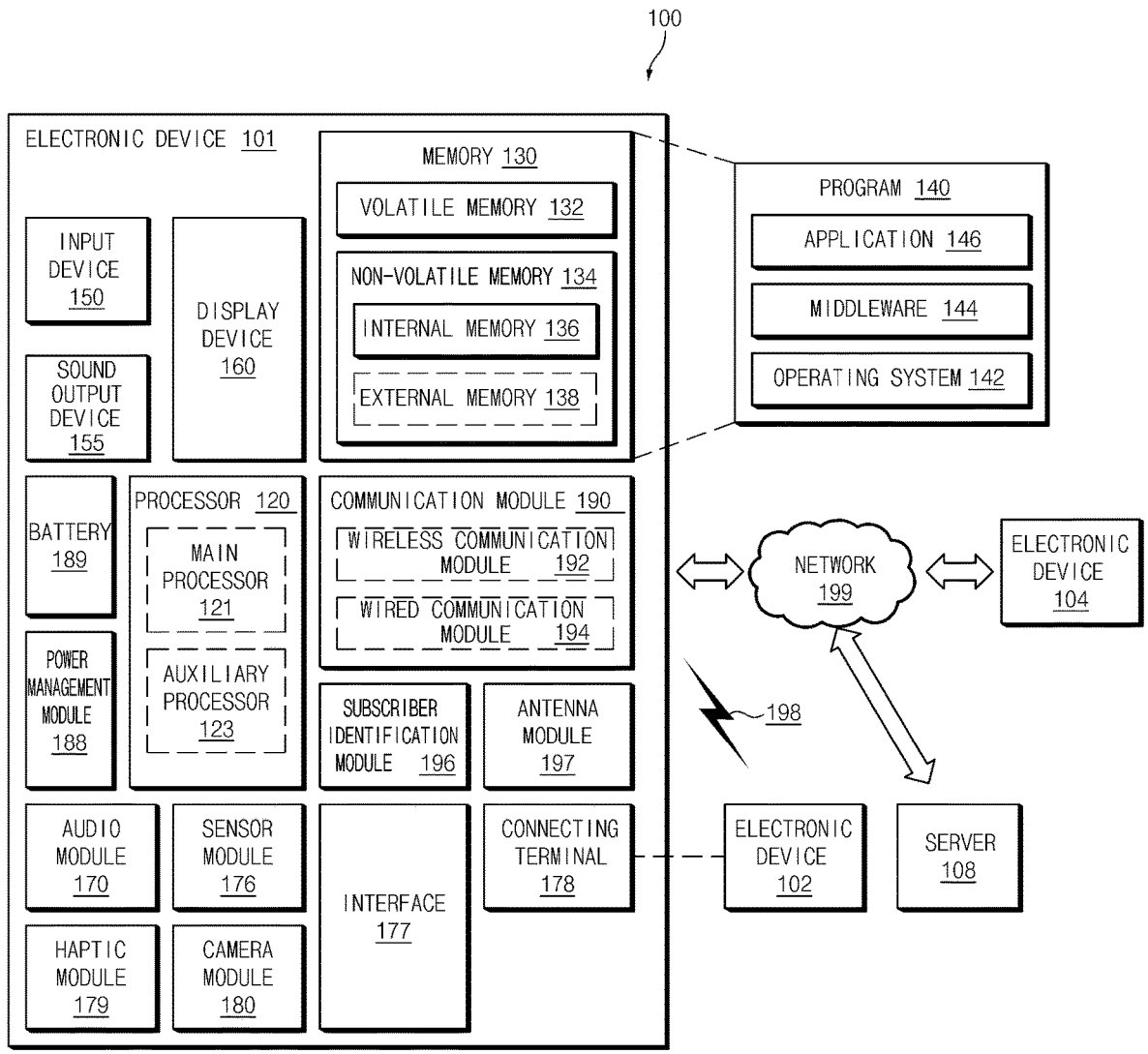
FIG. 1 is a block diagram illustrating an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160 (or display module), an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display). The term "processor" shall be understood to refer to both the singular and plural contexts in this disclosure.

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The display device 160 can include a flexible display. For example, the flexible display may be disposed in the electronic device in a form in which at least one area can curved, foldable, or rollable.

Figure 2:
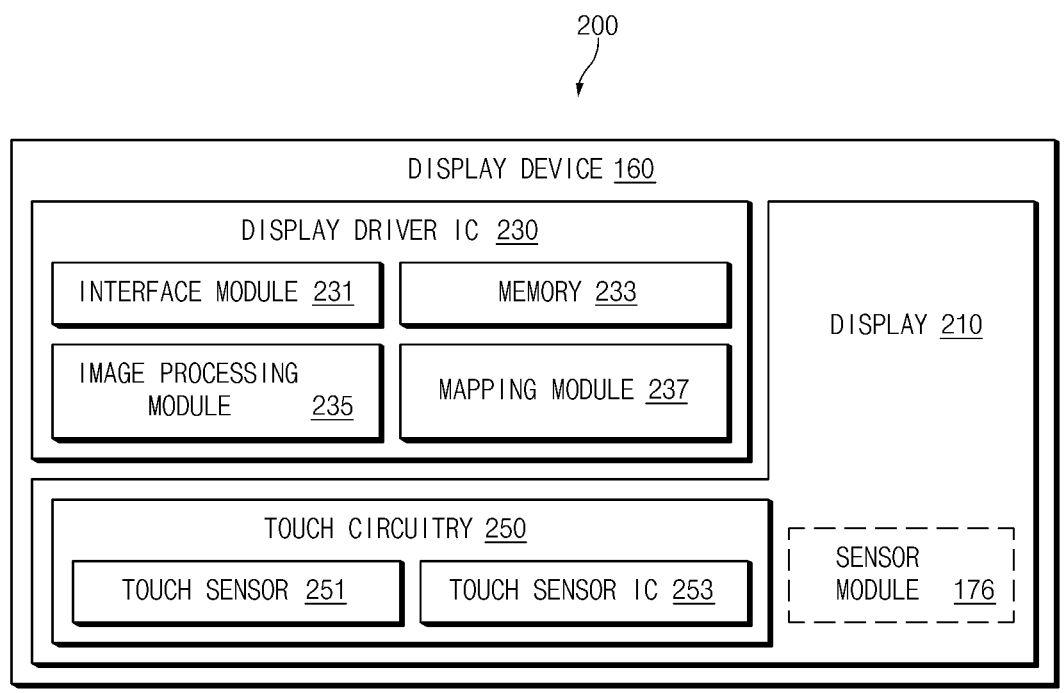
FIG. 2 is a block diagram 200 illustrating the display module according to certain embodiments.

FIG. 2 is a block diagram 200 illustrating the display module 160 according to certain embodiments. Referring to FIG. 2, the display module 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display module 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display module 160.

According to an embodiment, the display module 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display module 160. For example, when the sensor module 176 embedded in the display module 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display module 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

The display device 160 can include a flexible display. The flexible display may be folded in an in-folding manner such that a display area faces inward, or may be folded in an out-folding manner such that the display area faces outward.

As will be described below, the display can avoid damaged from external impact when the electronic device is folded in an out-folding manner. Accordingly, an electronic device 300 can include a display 330. The display 330 can have an edge that is rotatably connected to an edge of a first housing 310. A second housing 320 can be slidably connected to lateral edges of the first housing 310 so as to telescopically extend and retract from an edge that is opposite of the edge that the display 330 is connected to.

The display 330 is approximately the size of the combined first housing 310 and second housing 320, when the second housing 320 is extended from the first housing. Thus, when the second housing 320 is extended, the display 330 can be rotated about the edge of the first housing 310 to lie on a surface of the first housing 310 and the second housing 320 (see FIG. 5).

The display 330 is foldable along an axis that corresponds to the width of the first housing. Thus, the display 330 includes a first area A1 which is connected to the first housing 310, and the second area A2 after the fold. Second area A2 can be folded inwards. (See FIG. 4). In certain embodiments, when second area A2 is folded inwards, the display 330 forms a roll. First area A1 can then be rotated about the first housing 310 so that the roll in the display 330 abuts the opposite edge of the first housing.

Figure 3:
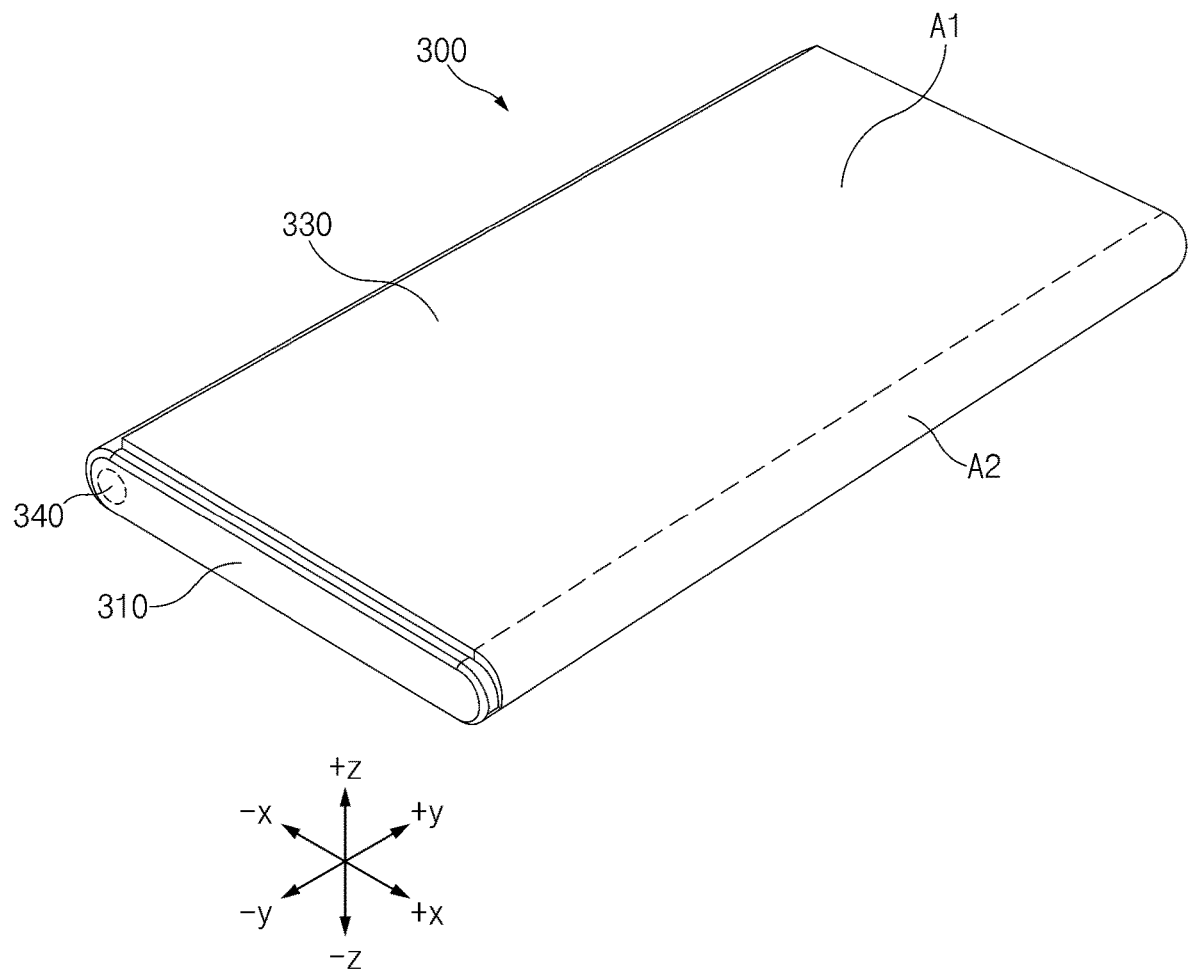
FIG. 3 is a perspective view illustrating an electronic device in a first state.
Figure 5:
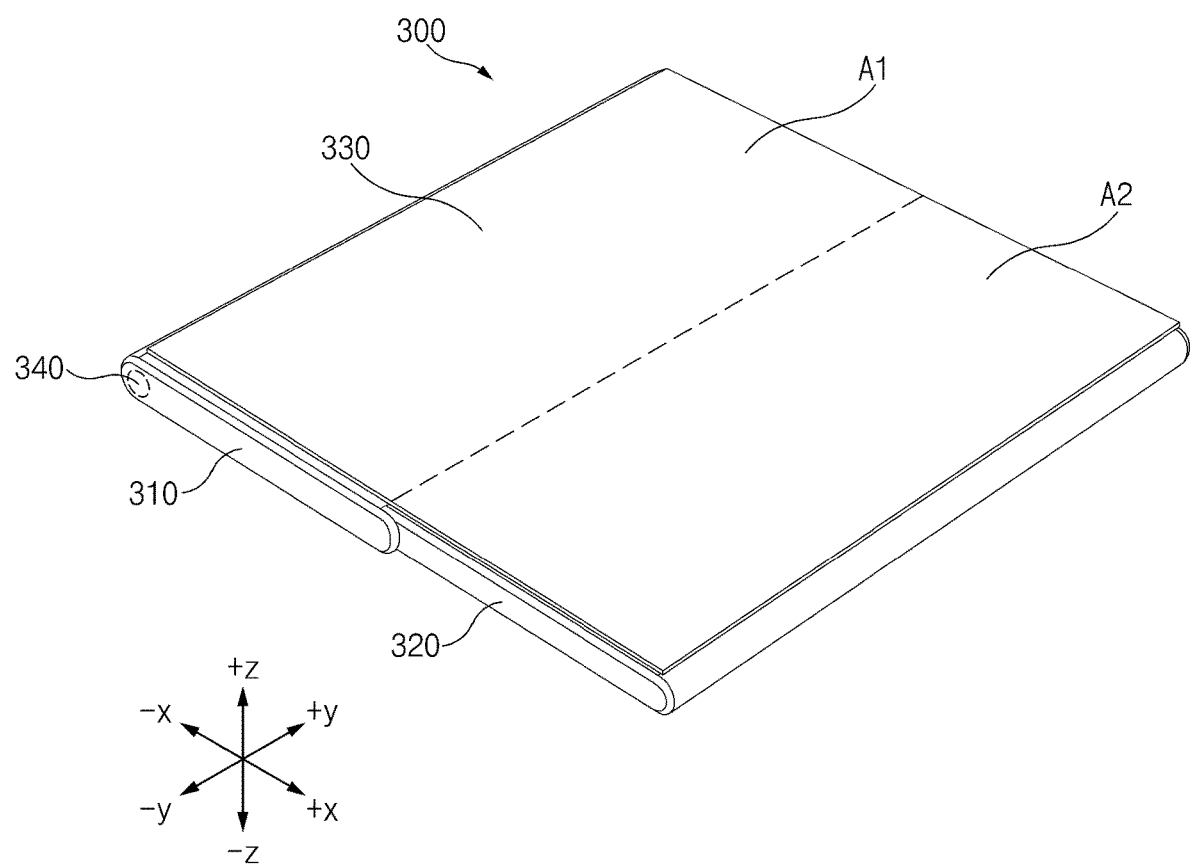
FIG. 5 is a perspective view illustrating the electronic device in a second state.

Hereinafter, an electronic device 300 according to an embodiment will be described with reference to FIGS. 3, 4, and 5. FIG. 3 is a perspective view illustrating the electronic device 300 in a first state (e.g., a closed state or a reduced mode). FIG. 4 is a perspective view illustrating the electronic device 300 in an intermediate state. FIG. 5 is a perspective view illustrating the electronic device 300 in a second state (e.g., an open state or an extended mode).

Referring to FIGS. 3, 4, and 5, the electronic device 300 may include a first housing 310, a second housing 320, a display 330, and a hinge member 340. The electronic device 300 may be configured to be in a first state (e.g., a closed state or a reduced mode), a second state (e.g., an open state or an extended mode), and the intermediate state. The electronic device 300 may be changed to the first state, the second state, or the intermediate state by a user operation or a mechanical operation. For example, the electronic device 300 may be changed from the first state to the second state through the intermediate state. The electronic device 300 may be changed from the second state to the first state through the intermediate state.

The first housing 310 and the second housing 320 may be slidably connected to slide relative to each other. The second housing 320 may be slidably coupled to one side of the first housing 310 (e.g., a lateral portion of the first housing 310 that faces the +x direction). For example, the second housing 320 may be a structure movable relative to the first housing 310. The second housing 320 may be coupled to the lateral portion of the first housing 310, which faces the +x direction, so as to slide relative to the first housing 310 in opposite directions (e.g., the +x/−x directions). In the first state of the electronic device 300, the second housing 320 may be located in the first housing 310. In the second state of the electronic device 300, at least part of the second housing 320 may be extracted from the first housing 310 in the +x direction and may be located outside the first housing 310. In certain embodiments, the second housing 320 can telescopically extend from the first housing 310.

In certain embodiments, the lateral walls of the first housing 310 can protrude being the second housing 320 when the second housing 320 is in the closed state. The space between the protrusions can accommodate a curvature of the folded display 330.

The display 330 may include a plurality of pixels and may display a screen on one surface thereof (e.g., a surface of the display 330 that faces the +z direction in FIG. 5). Hereinafter, the surface of the display 330 on which the screen is displayed (e.g., the surface of the display 330 that faces the +z direction in FIG. 5) is referred to as the "display surface" of the display 330, and the surface facing away from the display surface (e.g., a surface of the display 330 that faces the −z direction in FIG. 5) is referred to as the "rear surface" of the display 330. The display 330 may be a flexible display, at least one area of which is able to be curved or rolled. The display 330 may include a first area (or, a basic area) A1 and a second area (or, an extended area) A2 adjacent to the first area A1. For example, the second area A2 may be adjacent to the first area A1 in the +x direction.

In an embodiment, the first state may refer to the state in which the area (or, size) of the display 330 visually exposed on the electronic device 300 is relatively reduced. The display 330 can be relatively reduced by folding. The second state may refer to the state in which the area (or, size) of the display 330 visually exposed on the electronic device 300 is relatively extended. The display 330 can be relatively extended by unfolding. For example, the second state may be a state in which the area of the display 330 visually exposed on the front surface of the electronic device 300 is larger than that in the first state.

In the first state of the electronic device 300 (e.g., in the electronic device 300 of FIG. 3), at least part of the second area A2 of the display 330 may be folded in the direction toward the rear surface of the display 330 (e.g., in the −z direction). The display 330 in the folded state may be disposed on one surface of the first housing 310. The first area A1 of the display 330 may be disposed on the front surface of the electronic device 300 and may be visually exposed. The at least part of the second area A2 of the display 330 may be disposed between the first area A1 of the display 330 and the one surface (e.g., a front plate 311 of FIG. 3) of the first housing 310 and may not be visually exposed. For example, in the first state of the electronic device 300, the display surface of the second area A2 of the display 330 may be disposed to face the one surface of the first housing 310, and the rear surface of the second area A2 may be disposed to face the rear surface of the first area A1 of the display 330. In the first state, the electronic device 300 may display a screen through the visually exposed first area A1.

In the second state of the electronic device 300 (e.g., in the electronic device 300 of FIG. 5), the display 330 may be unfolded, and the first area A1 and the second area A2 may be visually exposed together. The display surface of the first area A1 and the display surface of the second area A2 may both be located on one plane and may be disposed to face one direction (e.g., the +z direction). As the second area A2 is additionally visually exposed in the second state of the electronic device 300, the exposed area of the display 330 may be extended. In the second state of the electronic device 300, the first area A1 of the display 330 may be located and lie on a surface of the first housing 310, and the second area A2 may be located and lie on a surface of the second housing 320. In the second state, the electronic device 300 may display a screen through the first area A1 and the second area A2 visually exposed.

One side of the first area A1 of the display 330 (e.g., a portion of the first area A1 located in the −x direction) may be coupled to one side of the first housing 310 (e.g., a portion of the first housing 310 located in the −x direction) so as to be rotatable about an axis of rotation RA facing a direction (e.g., the +y direction or the −y direction) perpendicular to a sliding direction (e.g., the +x direction or the −x direction) of the second housing 320 by the hinge member 340.

In the intermediate state of the electronic device 300, the display 330 may rotate about the axis of rotation RA in one direction to form a specified angle (e.g., a right angle) with respect to the first housing 310. For example, in the intermediate state of the electronic device 300, the remaining area of the display 330 other than the one side coupled with the first housing 310 may be spaced apart from the first housing 310. The display 330 may be at least partially folded or unfolded while forming the specified angle (e.g., a right angle) with respect to the first housing 310.

According to an embodiment, the display 330 may further include a sensing layer, and the electronic device 300 may sense an input (e.g., a direct touch input or hovering input) of an external object (e.g., a finger or a stylus pen) to the first area A1 and the second area A2 of the display 330 using the sensing layer.

Figure 6:
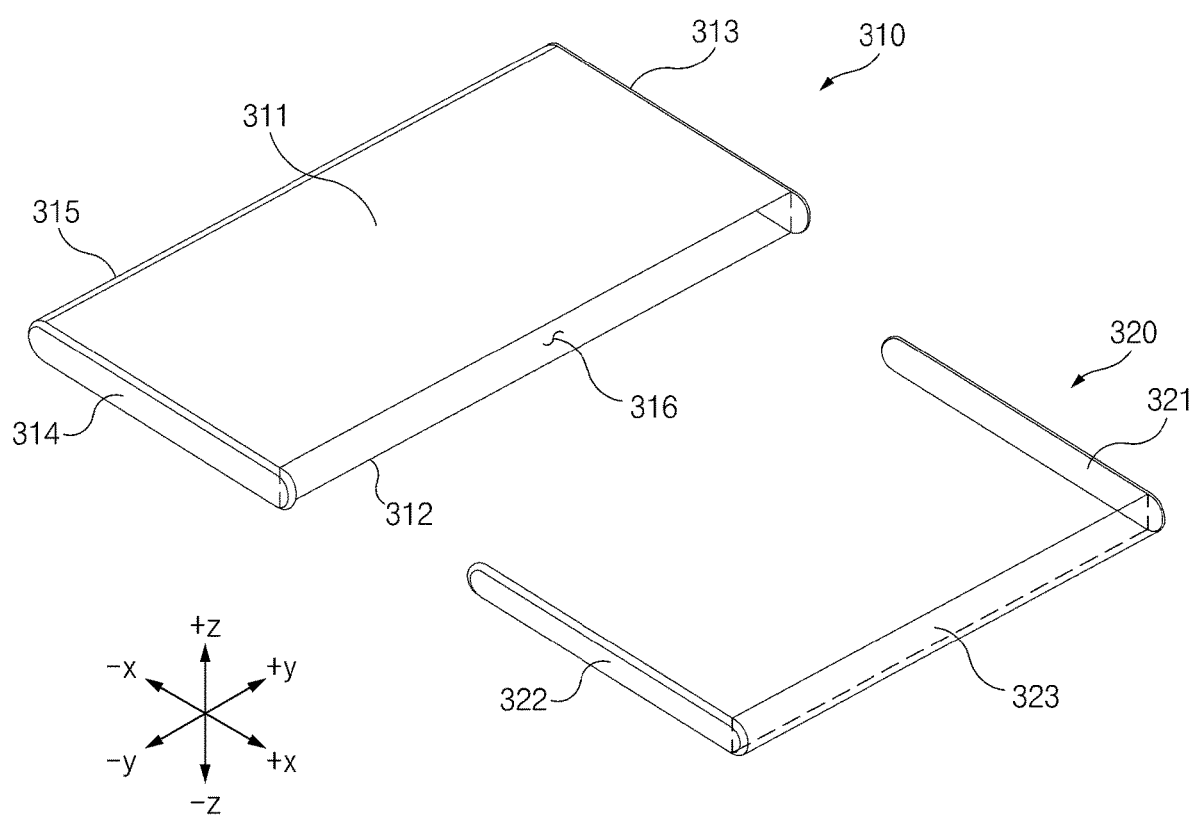
FIG. 6 is an exploded perspective view illustrating a first housing and a second housing included in the electronic device according to an embodiment.

FIG. 6 describes the first housing 310 and the second housing 320. The first housing 310 can include a front plate 311 and a back plate 312, with lateral portions that over three sides and have an opening on one side. The second housing 320 can be slidably connected to the interior of at least one lateral portion. Accordingly, the second housing 320 can be slid to fit inside of the first housing 310 or slid out of the first housing 310.

FIG. 6 is an exploded perspective view illustrating the first housing 310 and the second housing 320 included in the electronic device according to an embodiment.

The first housing 310 may include the front plate 311, a back plate 312, lateral portions 313, 314, and 315, and an opening 316. Components included in the electronic device (e.g., the electronic device 300 of FIG. 3) may be disposed in the first housing 310.

The front plate 311 may face the back plate 312 in the thickness direction (e.g., the +z direction or the −z direction). In the electronic device in the first state (e.g., in the electronic device 300 of FIG. 3), the display (e.g., the display 330 of FIG. 3) in a folded state may be seated on the front plate 311. In the electronic device in the first state, the second area of the display (e.g., the second area A2 of FIG. 3) may be located between the first area and the front plate 311, and the display surface of the second area of the display may be seated on the front plate 311. In the electronic device in the second state (e.g., in the electronic device 300 of FIG. 5), the rear surface of the first area (e.g., the first area A1 of FIG. 5) of the display (e.g., the display 330 of FIG. 5) may be seated on the front plate 311.

The lateral portions 313, 314, and 315 may include the first side cover 313, the second side cover 314, and the third side cover 315. The first side cover 313, the second side cover 314, and the third side cover 315 may surround the space between the front plate 311 and the back plate 312 and may form the opening 316 in one direction (e.g., the +x direction). The first side cover 313 may face the second side cover 314. The third side cover 315 may extend from one end portion of the first side cover 313 to one end portion of the second side cover 314. The first side cover 313 may be located on the side surface of the first housing 310 that faces the +y direction. The second side cover 314 may be located on the side surface of the first housing 310 that faces the −y direction. The third side cover 315 may be located on the side surface of the first housing 310 that faces the −x direction. According to an embodiment, at least one of the first side cover 313, the second side cover 314, or the third side cover 315 may be integrally formed with the front plate 311 or the back plate 312.

The opening 316 may be located in one area of a side surface of the first housing 310. For example, the opening 316 may be located in the side surface of the first housing 310 that faces the +x direction. The second housing 320 may be inserted into, or withdrawn from, the first housing 310 through the opening 316.

The second housing 320 may include a first support part 321, a second support part 322, and a third support part 323. The first support part 321 may face the second support part 322 in one direction (e.g., the +y direction or the −y direction). The third support part 323 may extend from one end of the first support part 321 to one end of the second support part 322. One end of the third support part 323 may be connected to the first support part 321, and an opposite end of the third support part 323 may be connected to the second support part 322. Unlike that illustrated in FIG. 6, the second housing 320 may further include a rear structure located on the surface thereof that faces the −z direction.

The second housing 320 may be coupled to the first housing 310 to slide in a first direction (e.g., the x-axis direction or the +x/−x directions). Through the opening 316 of the first housing 310, the second housing 320 may be inserted into the first housing 310 by sliding in the −x direction, or may be withdrawn from the first housing 310 by sliding in the +x direction. In the electronic device in the first state (e.g., in the electronic device of FIG. 3), the second housing 320 may be disposed in the first housing 310. For example, in the first state, the first support part 321, the second support part 322, and the third support part 323 may be located in the first housing 310. The first support part 321 may be adjacent to the first side cover 313 of the first housing 310, the second support part 322 may be adjacent to the second side cover 314 of the first housing 310, and the third support part 323 may be adjacent to the opening 316 of the first housing 310. In the electronic device in the second state (e.g., in the electronic device 300 of FIG. 5), at least part of the second housing 320 may be withdrawn from the first housing 310 and may be disposed on the rear surface of the second area of the display. For example, in the second state, at least a portion of the first support part 321, at least a portion of the second support part 322, and the third support part 323 may be located outside the first housing 310 and may support the rear surface of the second area of the display.

Figure 7:
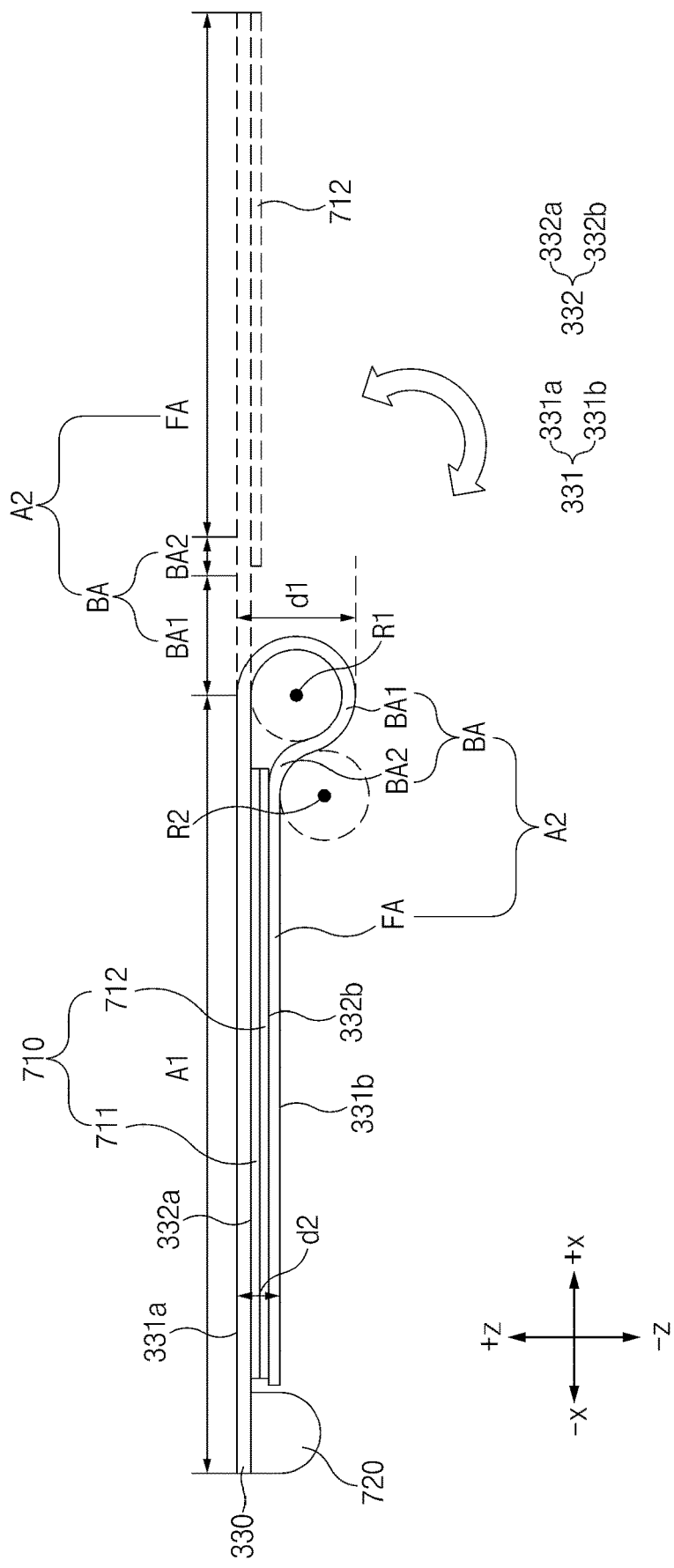
FIG. 7 is a sectional view illustrating a display and some components included in the electronic device according to an embodiment.

FIG. 7 describes the display 330. The display 330 includes a display surface 331 and a rear surface 332. The display surface 331 is the surface where content can be displayed for the user. In certain embodiments, the display surface 331 may also be touch sensitive. The rear surface 332 is disposed on metal layers 710.

In the X direction, the display 330 includes a first area A1 and a second area A2. The second area A2 includes a flat area FA and bendable areas BA1 and BA2. Bending areas BA1 and BA2 can be bent to allow the display 330 to form a folded state, wherein BA1 and BA2 form curvature R1.

A connecting member 720 is connected to the first area A1 and can rotatably connected the display 330 to an edge of the first housing 310.

Referring to FIG. 7, the display 330 and components 710 and 720 included in the electronic device (e.g., the electronic device 300 of FIG. 3) according to an embodiment will be described. FIG. 7 is a sectional view illustrating the display 330 and the components 710 and 720 included in the electronic device according to an embodiment. The electronic device according to an embodiment may include the display 330, the metal layer 710, and the connecting member 720.

The display 330 may include a display surface 331 (the outer surface when folded) and a rear surface 332 (the inner surface when folded) located on the opposite side to the display surface 331. The display 330 may display a screen on the display surface 331.

The display 330 may include the first area A1 and the second area A2. The second area A2 of the display 330 may be adjacent to one edge (e.g., an edge facing the +x direction) of the first area A1. The second area A2 of the display 330 may include a flat area FA and a bending area BA located between the flat area FA and the first area A1. The first area A1 and the flat area FA of the display 330 may be flat, and the bending area BA. The bending area BA may be curved in at least one direction. The bending area BA of the display 330 may be curved such that the display surface 331 faces outward. The bending area BA may be curved in the direction toward the rear surface 332 (e.g., in the −z direction), and the flat area FA of the second area A2 may be located under a rear surface 332a of the first area A1 (e.g., in the −z direction). For example, when the bending area BA of the display 330 is curved, a rear surface 332b of the flat area FA may be adjacent to and face the rear surface 332a of the first area A1. In the first state of the electronic device, the bending area BA of the display 330 may be folded. In the second state of the electronic device, the display 330 may be unfolded, and a display surface 331a of the first area A1 and a display surface 331b of the second area A2 of the display 330 may face one direction (e.g., the +z direction).

The bending area BA may include a first bending area BA1 adjacent to the first area A1 and curved in one direction and a second bending area BA2 adjacent to the first bending area BA1 and curved in another direction. For example, the first bending area BA1 may be curved such that the center R1 of virtual curvature is located on one side of the rear surface 332 of the display 300, and the second bending area BA2 may be curved such that the center R2 of virtual curvature is located on one side of the display surface 331b of the second area A2 of the display 330. In the state in which the display 330 is folded, the distance d1 between the highest point and the lowest point of the display surface 331b of the first bending area BA1 (e.g., 2*(the radius of curvature of the first bending area BA1)) may be greater than the distance d2 between the display surface 331a of the first area A1 and the display surface 331b of the flat area FA. As the display 330 included in the electronic device according to an embodiment includes the first bending area BA1 curved in the one direction and the second bending area BA2 curved in the other direction, the bending area BA may have a small curvature while the display 330 is folded such that the first area A1 and the flat area BA make contact with each other, and stress caused by the bending of the display 330 may be reduced.

The metal layer 710 may include a first metal layer 711 located on the rear surface 332a of the first area A1 of the display 330 and a second metal layer 712 located on the rear surface 332b of the flat area FA. The metal layer 710 may support the first area A1 and the flat area FA such that the first area A1 and the flat area FA of the display 330 remain flat.

The connecting member 720 may be located on the rear surface 332a of one edge (e.g., an edge facing the −x direction) of the first area A1 of the display 330. The connecting member 720 may be coupled to one side of the first housing (e.g., the first housing 310 of FIG. 3) by the hinge member (e.g., the hinge member 340 of FIG. 3).

Figure 8:
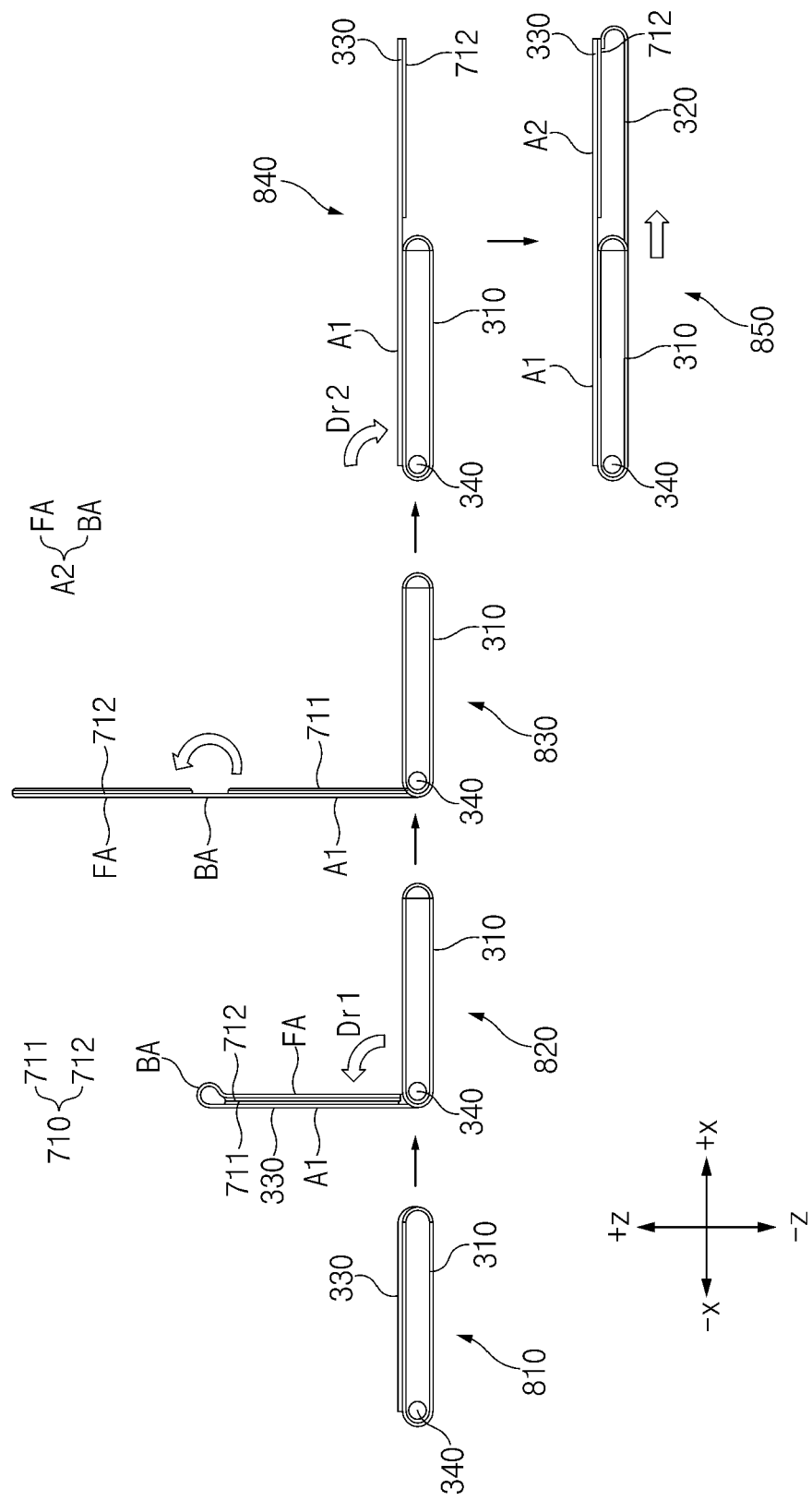
FIG. 8 is a view illustrating a change of state of the electronic device according to an embodiment.

Hereinafter, a change of state of the electronic device (e.g., the electronic device 300 of FIG. 3) according to an embodiment will be described with reference to FIG. 8. FIG. 8 is a view illustrating a change of state of the electronic device according to an embodiment.

FIG. 8 shows a progression of the electronic device from a first state 810. In the first state, 810, the display 330 is folded, and the first area A1 and the second area A2 lie on the first housing 310. The second housing 320 is retracted into the first housing 310. In the first intermediate state 820, the folded display 330 is rotated about hinge member 340, such that the folded display 330 no longer rests on the first housing 310. In the second intermediate state 830, the bending area BA are straightened, thus causing the rear surface of the second area A2 to separate from the rear surface of the first area A1. In the third intermediate state, the extended display 330 is rotated so that the first area A1 lies on the surface of the first housing 310. In the second state 850, the second housing 320 is extended from the first housing 310, to slide under the second area A2

Referring to FIG. 8, the electronic device according to an embodiment may include the first housing 310, the second housing 320, the display 330, the hinge member 340, and the metal layer 710. The display 330 may include the first area A1 and the second area A2. The second area A2 may include the flat area FA and the bending area BA located between the flat area FA and the first area A1. One end portion (e.g., an end portion facing the −x direction) of the display 330 may be rotatably coupled to the first housing 310 by the hinge member 340. The metal layer 710 may include the first metal layer 711 located on the rear surface of the first area A1 of the display 330 and the second metal layer 712 located on the rear surface of the flat area FA of the second area A2.

The electronic device according to an embodiment may be changed from a first state 810 to a second state 850 through a first intermediate state 820, a second intermediate state 830, and a third intermediate state 840. The electronic device according to an embodiment may be changed from the second state 850 to the first state 810 through the third intermediate state 840, the second intermediate state 830, and the first intermediate state 820. The electronic device according to an embodiment may be changed to the first state or the second state by a user operation or a mechanical operation.

In the first state 810 of the electronic device according to an embodiment, the second housing 320 may be located in the first housing 310. The bending area BA of the display 330 may be folded such that the display surface of the display 330 faces outward. The rear surface of the first area A1 and the rear surface of the flat area FA of the second area A2 of the display 330 may face each other. The second metal layer 712 may be superimposed on the first metal layer 711. The display 330, the bending area BA of which is folded, may be seated on one surface (e.g., the front plate 311 of FIG. 6) of the first housing 310. In certain embodiment, the bending area BA of the display 330 can abut opening 316 of the first housing 310 and rest between protrusions of lateral portions 313 and 314.

In the first intermediate state 820 of the electronic device according to an embodiment, the remaining portion of the display 330 may rotate in one direction (e.g., the counter-clockwise direction Dr1) relative to the first housing 310, with the one end portion of the display 330 connected to the first housing 310. In the first intermediate state 820 of the electronic device according to an embodiment, the display 330, the bending area BA of which is folded, may be disposed to have a specified angle (e.g., 90°) with respect to the first housing 310.

In the second intermediate state 830 of the electronic device according to an embodiment, the bending area BA of the display 330 may be unfolded. The first area A1 and the second area A2 of the display 330 may be disposed side by side in one direction (e.g., the +z direction).

In the third intermediate state 840 of the electronic device according to an embodiment, the display 330 may rotate in another direction (e.g., the clockwise direction Dr2) with the one end portion of the display 330 connected to the first housing 310, and the first area A1 of the display 330 may be seated on the first housing 310.

In the second state 850 of the electronic device according to an embodiment, the second housing 320 may be slid and withdrawn from the first housing 310. The first housing 310 may be located under the first area A1 of the display 330, and the second housing 320 may be located under the second area A2 of the display 330. The first housing 310 may support the first area A1 of the display 330, and the second housing 320 may support the second area A2 of the display 330.

It is noted that the foregoing is not intended to be an exhaustive list of every state that the electronic device can be in. For example, there are other intermediate states where the second housing 320 is extended from the first housing 310 while the electronic device is in the first state 810, the first intermediate state 820 or the third intermediate state 830.

Figure 9:
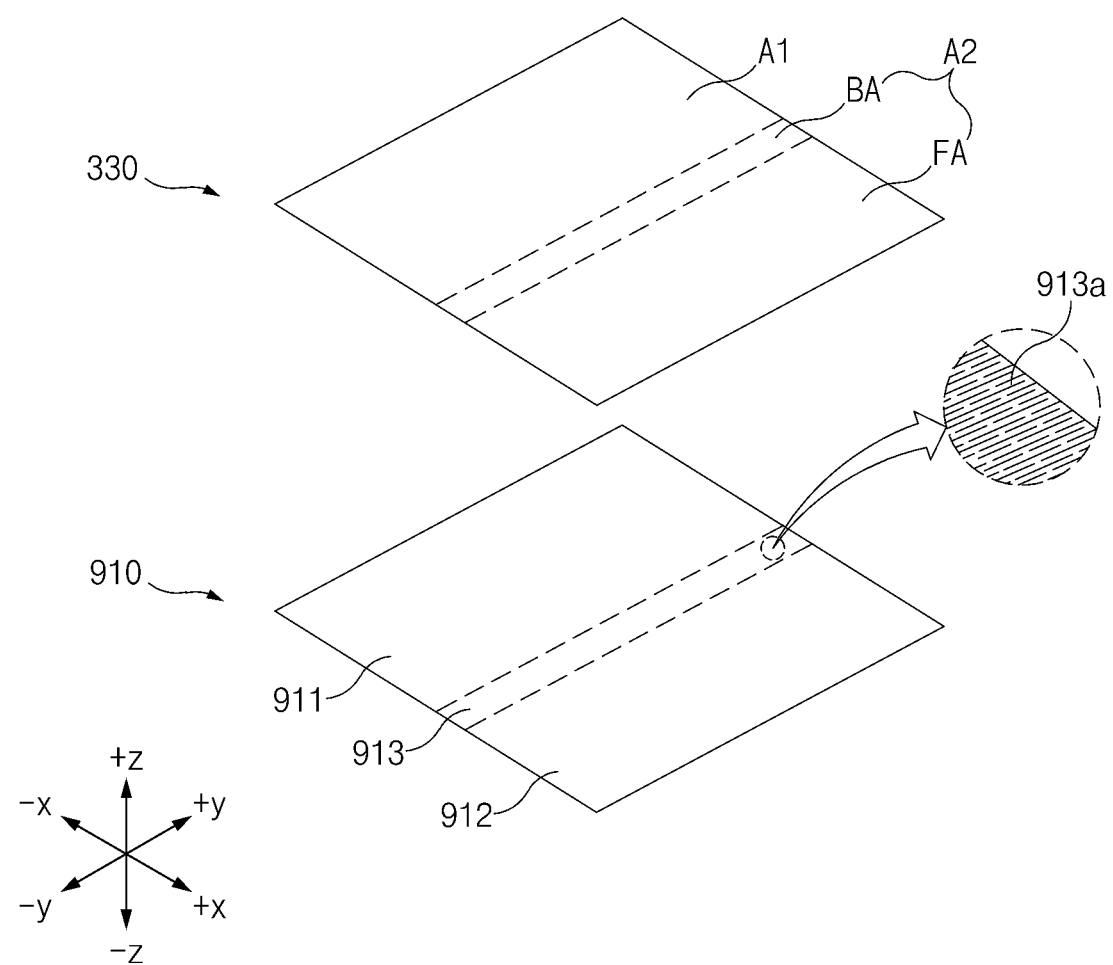
FIG. 9 is an exploded perspective view illustrating some components included in the electronic device according to an embodiment.

Hereinafter, some components of the electronic device according to an embodiment will be described with reference to FIG. 9. FIG. 9 is an exploded perspective view illustrating some components included in the electronic device according to an embodiment.

Referring to FIG. 9, the electronic device (e.g., the electronic device 300 of FIG. 3) according to an embodiment may include the display 330 and a metal layer 910 located on the rear surface of the display 330. Here, the display 330 is supported by a single metal layer 910 with bendable third portion 913 the corresponds with the bending area BA.

The display 330 may include the first area A1 and the second area A2. The second area A2 may include the flat area FA and the bending area BA located between the flat area FA and the first area A1.

The metal layer 910 may include a first portion 911, a second portion 912, and a third portion 913. The third portion 913 of the metal layer 910 may be located between the first portion 911 and the second portion 912. The first portion 911 of the metal layer 910 may be located on the rear surface of the first area A1 of the display 330 and may support the first area A1 of the display 330. The second portion 912 of the metal layer 910 may be located on the rear surface of the flat area FA of the second area A2 of the display 330 and may support the flat area FA of the second area A2 of the display 330. The third portion 913 of the metal layer 910 may be located on the rear surface of the bending area BA of the second area A2 of the display 330 and may support the bending area BA of the display 330. The third portion 913 of the metal layer 910 may include a mesh structure. For example, the third portion 913 of the metal layer 910 may include a plurality of slits 913a. The third portion 913 of the metal layer 910, which includes the plurality of slits 913a, may be stretchable and may be curved together as the bending area BA of the display 330 is curved.

In certain embodiments, the entire second area A2 can be bendable. The electronic device can be in a state where the second area A2 is rolled in a spiral having a radius that is approximately the thickness of the first housing 310.

Figure 10:
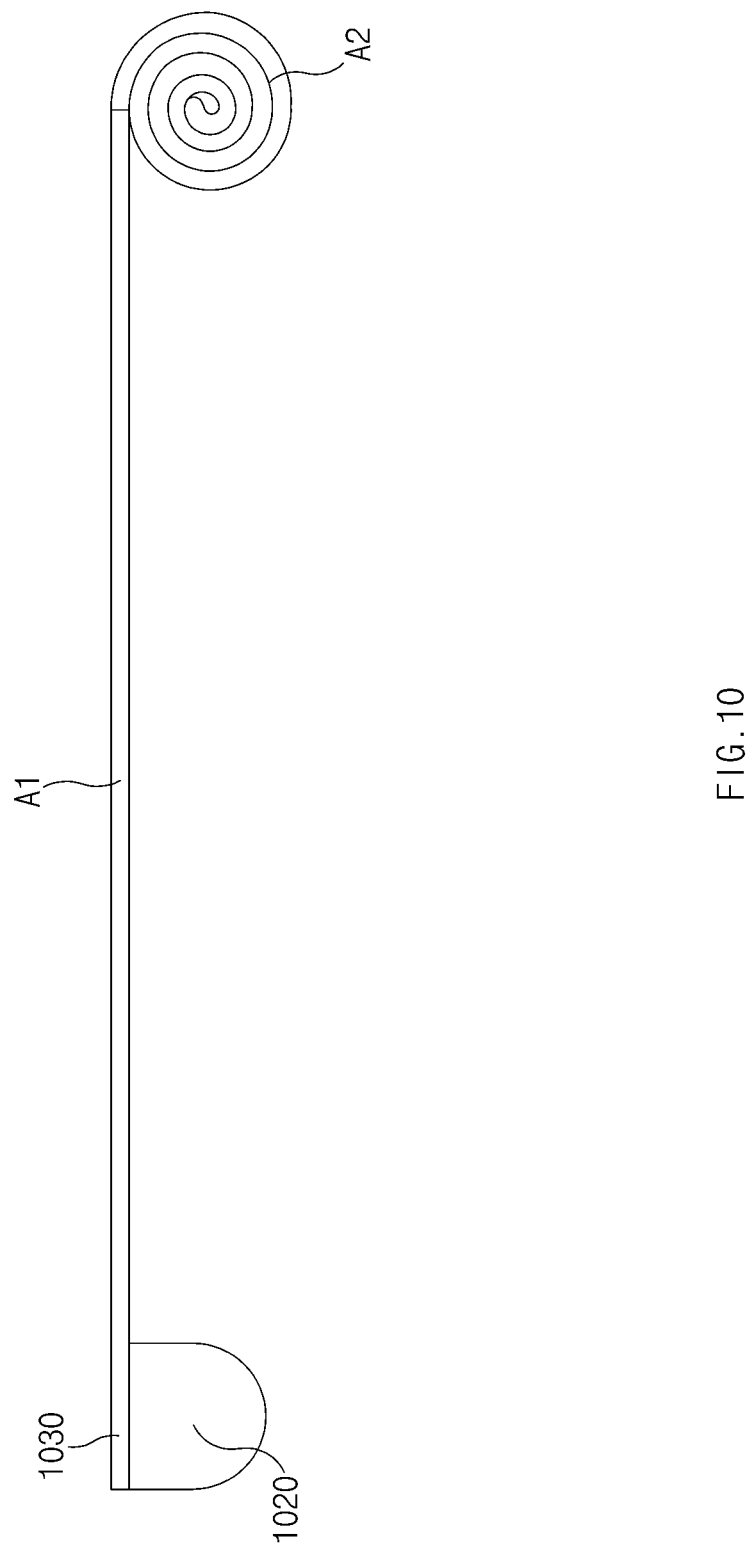
FIG. 10 is a sectional view illustrating some components included in the electronic device according to an embodiment.

Hereinafter, components 1020 and 1030 included in the electronic device (e.g., the electronic device 300 of FIG. 3) according to an embodiment will be described with reference to FIG. 10. FIG. 10 is a sectional view illustrating the components 1020 and 1030 included in the electronic device according to an embodiment. Referring to FIG. 10, the electronic device according to an embodiment may include the display 1030 and the connecting member 1020.

The display 1030 may include a first area A1 and a second area A2. The first area A1 of the display 1030 may be flat, and the second area A2 of the display 1030 may be rolled. For example, the entire area of the second area A2 may correspond to the bending area. In the first state of the electronic device, the second area A2 of the display 1030 in a rolled state may be disposed on one side of the first housing (e.g., the first housing 310 of FIG. 6) (e.g., in the +x direction). In the second state of the electronic device, the second area A2 of the display 1030 may be unrolled, the first area A1 of the display 1030 may be disposed on the first housing, and the second area A2 may be disposed on the second housing (e.g., the second housing 320 of FIG. 6).

The connecting member 1020 may be located on the rear surface of one edge of the first area A1 of the display 1030. The connecting member 1020 may be coupled to one side of the first housing. For example, the connecting member 1020 may be rotatably coupled to the one side of the first housing by a hinge member (e.g., the hinge member 340 of FIG. 3).

In certain embodiments, the electronic device may only include the first housing 310. The second area A2 may have a fixing member 1110 that acts as a collapsible splint coupled to the rear surface. Thus, when the second area A2 is unfolded, the fixing member 1110 can be moved down to form a splint that prevents bending in the bending area BA.

Figure 11:
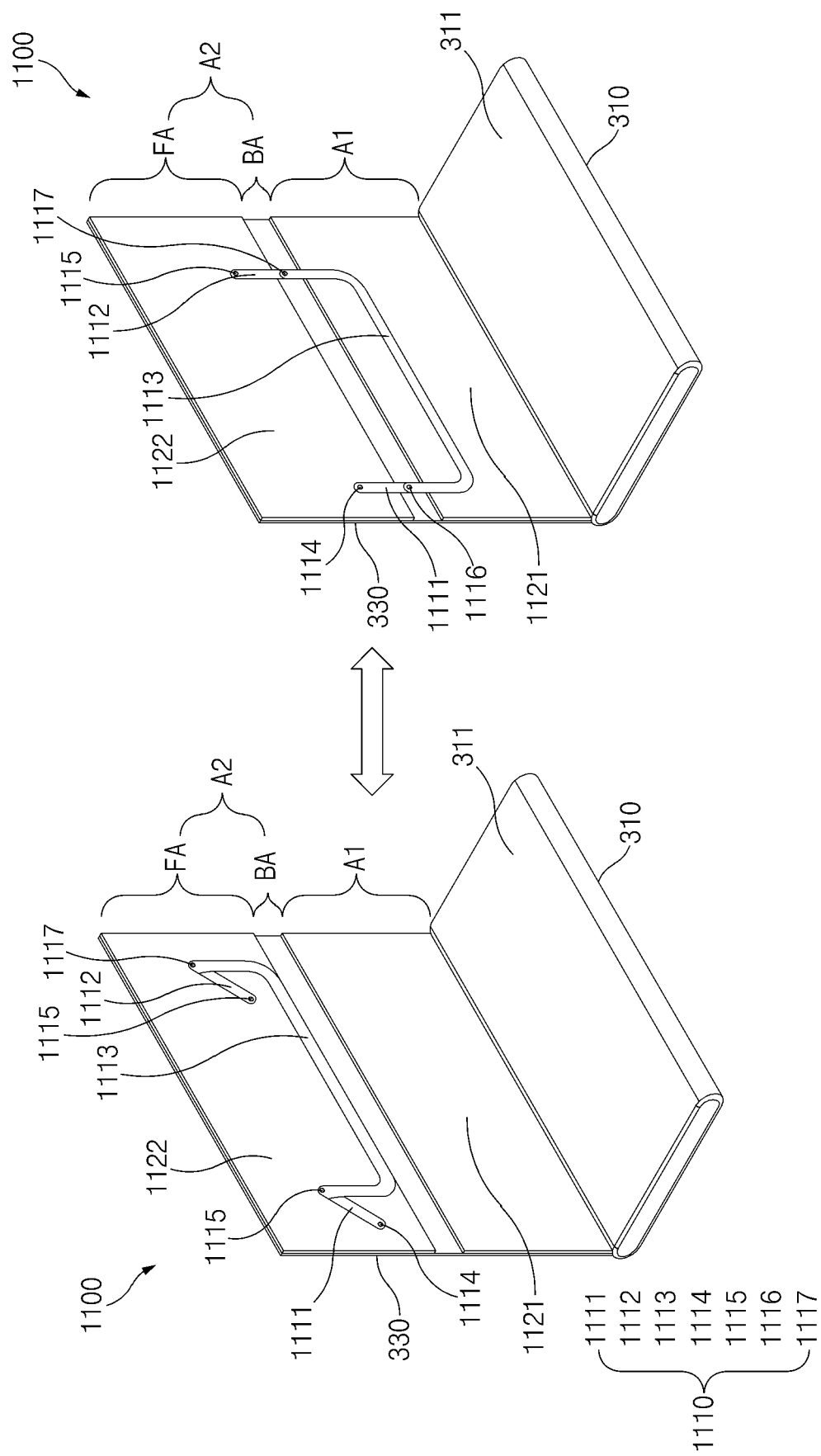
FIG. 11 is a perspective view of an electronic device in a third state as viewed in one direction.
Figure 12:
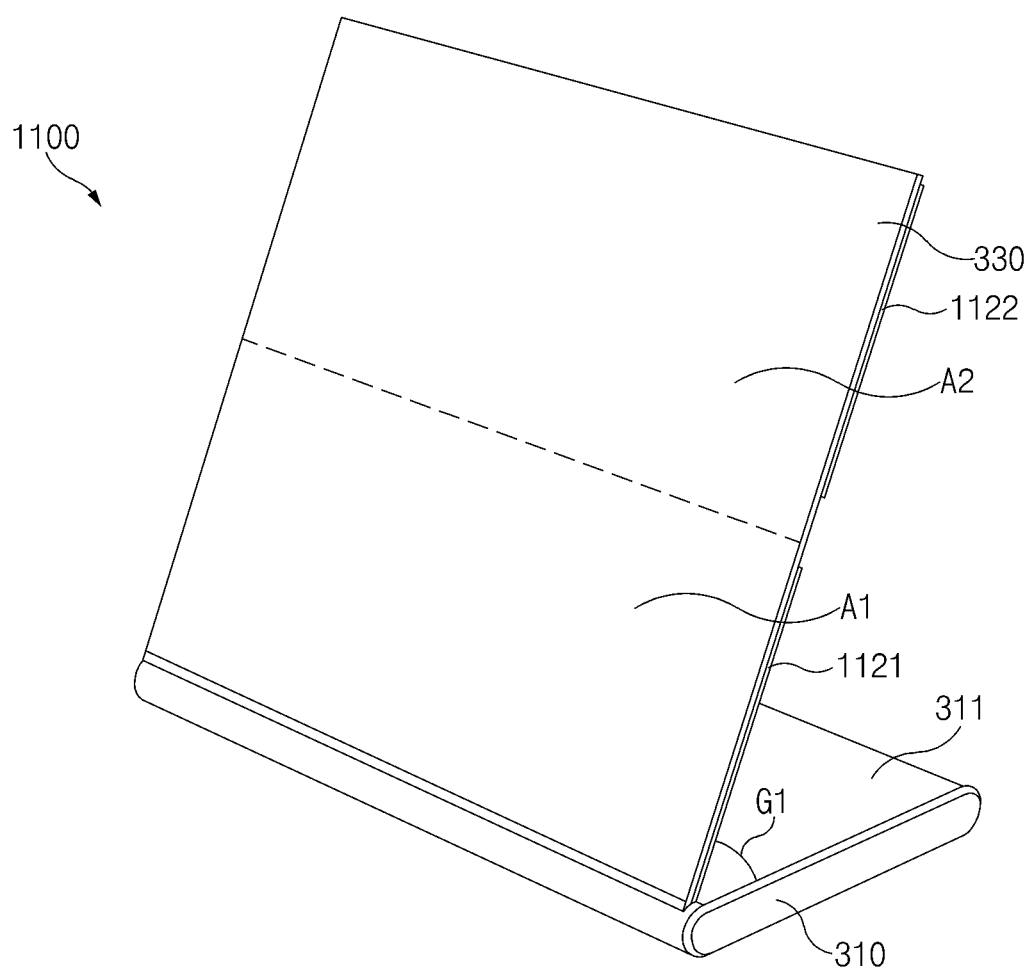
FIG. 12 is a perspective view of the electronic device in the third state as viewed in another direction.

Hereinafter, an electronic device 1100 according to an embodiment will be described with reference to FIGS. 11 and 12. FIG. 11 is a perspective view of the electronic device in a third state as viewed in one direction. FIG. 12 is a perspective view of the electronic device in the third state as viewed in another direction.

Referring to FIGS. 11 and 12, the electronic device 1100 according to an embodiment may include a first housing 310, a second housing (not illustrated), a display 330, a first metal layer 1121, a second metal layer 1122, and a fixing member 1110. The electronic device 1100 according to an embodiment may include the third state in which the unfolded display 330 is fixed to have a specified angle G1 with respect to the first housing 310.

The display 330 may include a first area A1 and a second area A2. The second area A2 may include a flat area FA and a bending area BA located between the flat area FA and the first area A1. The display 330 may be rotatably fastened to one side of the first housing 310. In an embodiment the display 330 may be fixed by the fixing member 1110 to have the specified angle G1 with respect to the first housing 310.

In another embodiment, the first housing 310 may include legs that extend from the surface of the first housing and supports the first area A1 at angle G1.

The first metal layer 1121 may be located on the rear surface of the first area A1 of the display 330, and the second metal layer 1122 may be located on the rear surface of the flat area FA of the second area A2.

The fixing member 1110 may fix the display 330 such that the display 330 remains unfolded in the third state of the electronic device 1100. When the display 330 is in a folded state, the fixing member 1110 may be disposed on the rear surface of the flat area FA of the second area A2 of the display 330 so as to overlap the flat area FA. In the third state of the electronic device 1100, at least one area of the fixing member 1110 may rotate to extend from the rear surface of the flat area FA of the display 330 to the rear surface of the bending area BA and the rear surface of the first area A1 and may be disposed to overlap the flat area FA, the bending area BA, and the first area A1. Accordingly, the fixing member 1110 may fix the display 330 such that the display 330 remains flat without being folded.

The fixing member 1110 may include a first fixing part 1111, a second fixing part 1112, a third fixing part 1113, a first connecting part 1114, a second connecting part 1115, a third connecting part 1116, and a fourth connecting part 1117.

One end of the first fixing part 1111 may be connected to the second metal layer 1122, and an opposite end of the first fixing part 1111 may be connected to one end of the third fixing part 1113. One end of the second fixing part 1112 may be connected to the second metal layer 1122, and an opposite end of the second fixing part 1112 may be connected to an opposite end of the third fixing part 1113. For example, the first fixing part 1111 and the second fixing part 1112 may have a rod shape extending in one direction, and the third fixing part 1113 may have the shape of "U". However, the shapes of the first fixing part 1111, the second fixing part 1112, and the third fixing part 1113 are not limited to those illustrated in FIG. 11.

The first connecting part 1114 may connect the one end of the first fixing part 1111 to the second metal layer 1122 such that the first fixing part 1111 is rotatable. The second connecting part 1115 may connect the one end of the second fixing part 1112 to the second metal layer 1122 such that the second fixing part 1112 is rotatable. The third connecting part 1116 may connect the one end of the third fixing part 1113 to the first fixing part 1111 such that the third fixing part 1113 is rotatable relative to the first fixing part 1111. The fourth connecting part 1117 may connect the opposite end of the third fixing part 1113 to the second fixing part 1112 such that the third fixing part 1113 is rotatable relative to the second fixing part 1112.

In one state of the electronic device, the first fixing part 1111, the second fixing part 1112, the third fixing part 1113, the first connecting part 1114, the second connecting part 1115, the third connecting part 1116, and the fourth connecting part 1117 may all be disposed on the rear surface of the flat area FA of the second area A2 of the display 330. In the third state of the electronic device 1100, the first fixing part 1111, the second fixing part 1112, and the third fixing part 1113 may be moved by rotation of the first connecting part 1114, the second connecting part 1115, the third connecting part 1116, and the fourth connecting part 1117 of the fixing member 1110, and the fixing member 1110 may be disposed across the bending area BA of the display 330. In the third state of the electronic device 1100, at least one part of the fixing member 1110 may be located on the rear surface of the second area A2 of the display 330, and the rest of the fixing member 1110 may be located on the rear surface of the first area A1 of the display 330. For example, the first fixing part 1111 and the second fixing part 1112 may be located on the rear surface of the second area A2 of the display 330, and at least a portion of the third fixing part 1113 may be located on the rear surface of the first area A2.

The electronic device 1100 according to an embodiment may include the third state in which the display 330 is fixed to be erected in an unfolded state and may thus provide, to a user, a large screen of the display in an erected state.

The foregoing may be useful for watching media.

In certain embodiments, the edge of the second area A2 and the second housing 320 can include magnets/metal members. The edge of the second area A2 can be affixed to first magnetic member 1310 and second magnetic member 1320. When the second housing 320 is extended, the display 330 unfolds.

Figure 13:
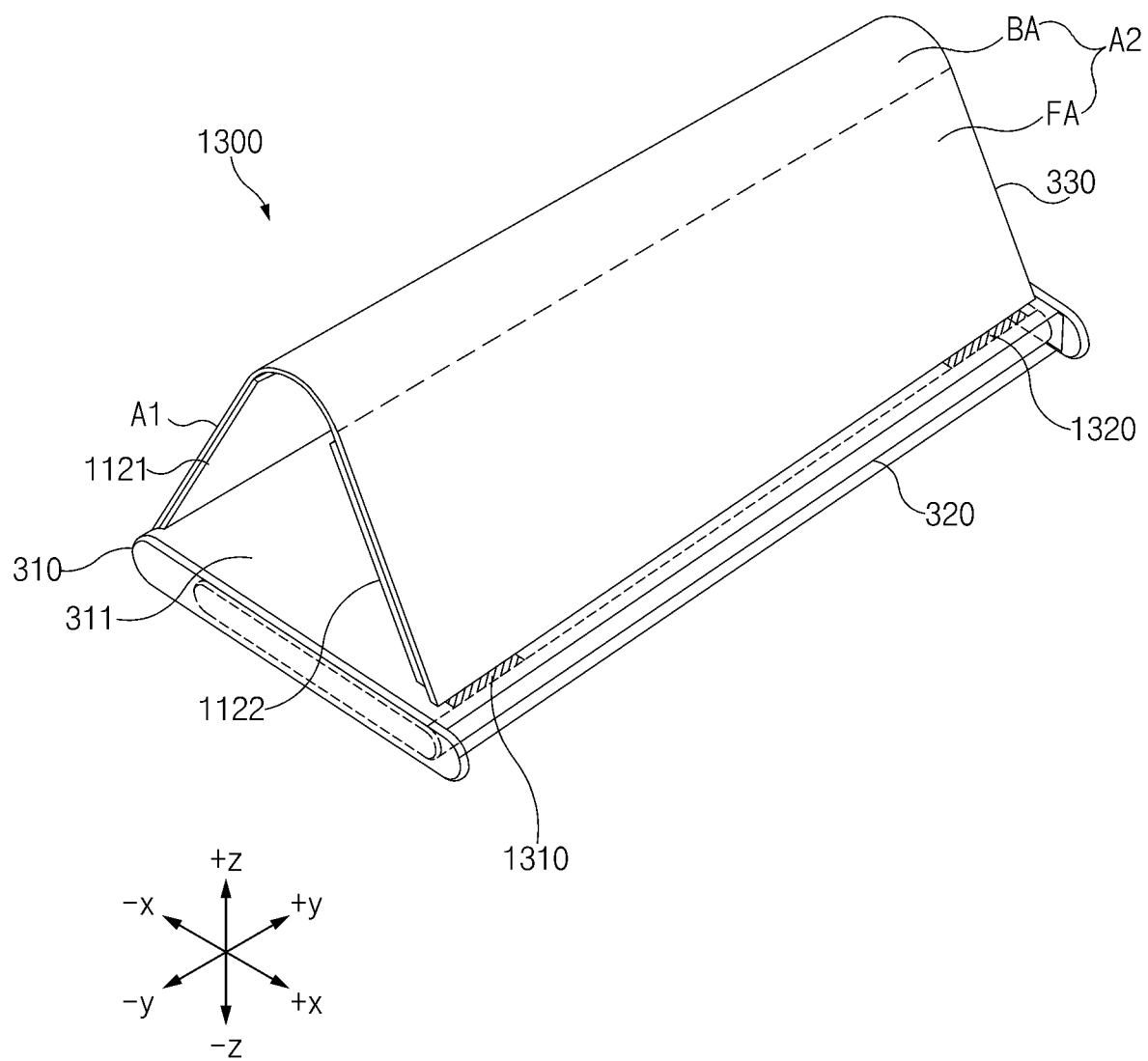
FIG. 13 is a perspective view illustrating an electronic device in a fourth state.
Figure 14:
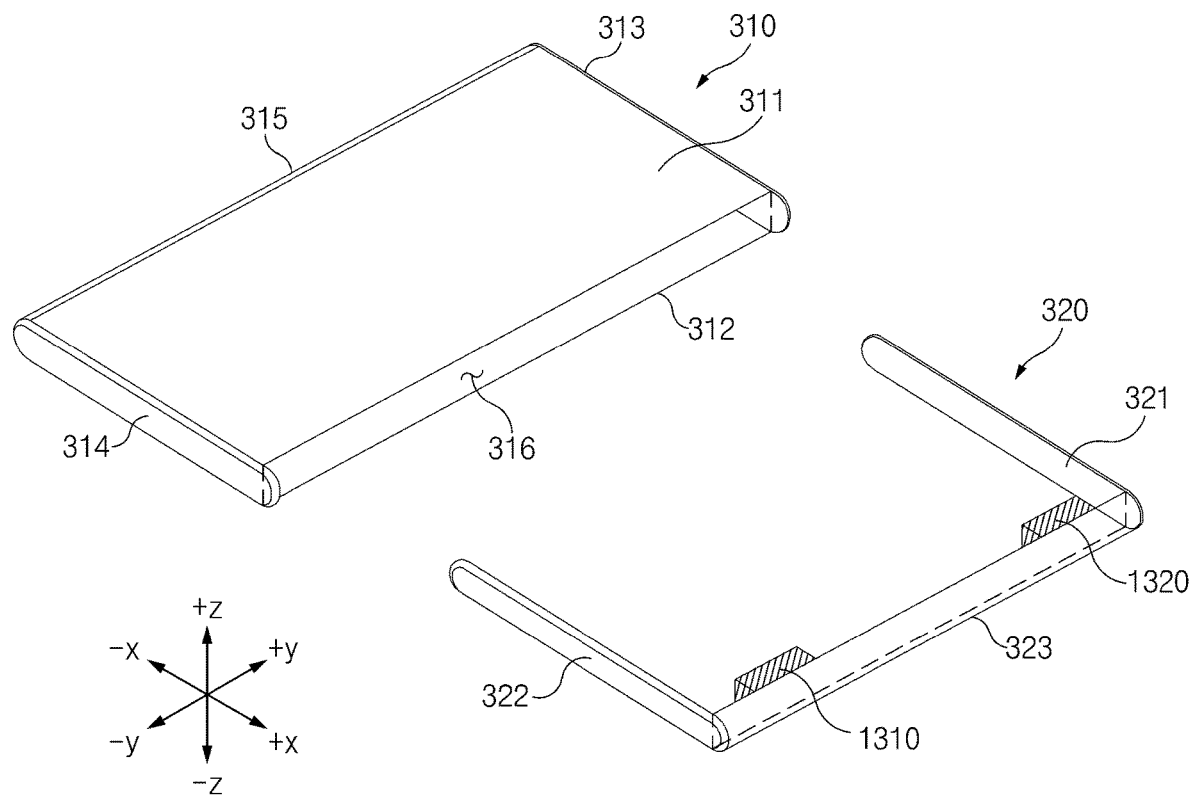
FIG. 14 is an exploded perspective view illustrating some components included in the electronic device according to an embodiment.

Hereinafter, an electronic device 1300 according to an embodiment will be described with reference to FIGS. 13 and 14. FIG. 13 is a perspective view illustrating the electronic device in a fourth state. FIG. 14 is an exploded perspective view illustrating some components included in the electronic device according to an embodiment.

The electronic device 1300 according to an embodiment may include a first housing 310, a second housing 320, a display 330, a first metal layer 1121, a second metal layer 1122, and at least one magnet member 1310 and 1320. The electronic device 1300 according to an embodiment may include the fourth state in which a bending area BA of the display 330 is curved with a specified angle such that a first area A1 and a flat area FA of a second area A2 are disposed to face away from each other.

The first housing 310 and the second housing 320 may be coupled to slide relative to each other. The first housing 310 may include a front plate 311, a back plate 312, lateral portions 313, 314, and 315, and an opening 316. The second housing 320 may include a first support part 321, a second support part 322, and a third support part 323. In the fourth state of the electronic device 1300, the second housing 320 may be located in the first housing 310.

The display 330 may include the first area A1 and the second area A2. The second area A2 may include the flat area FA and the bending area BA located between the flat area FA and the first area A1. In the fourth state of the electronic device 1300, one end of the display 330 may be rotatably coupled to one edge (e.g., an edge located in the −x direction) of the first housing 310, and an opposite end of the display 330 may be detachably fixed to an opposite edge (e.g., an edge located in the +x direction) of the first housing 310. In the fourth state of the electronic device 1300, the first area A1 of the display 330 may be disposed to face one direction (e.g., the −x direction), and the flat area FA of the second area A2 may be disposed to face an opposite direction (e.g., the +x direction). For example, the display 330 may be fixed in a tent shape. According to an embodiment, the display 330 may display a screen in opposite directions in the fourth state of the electronic device 1300.

The first metal layer 1121 may be located on the rear surface of the first area A1 of the display 330, and the second metal layer 1122 may be located on the rear surface of the flat area FA of the second area A2.

The at least one magnet member 1310 and 1320 may include the first magnet member 1310 and the second magnet member 1320. The first magnet member 1310 may be attached to one area of the third support part 323 of the second housing 320. The second magnet member 1320 may be attached to another area of the third support part 323 of the second housing 320. In the fourth state of the electronic device 1300, the first magnet member 1310 and the second magnet member 1320 may be attached to the second housing 320 and may be located in the first housing 310. An attractive force may act between the at least one magnet member 1310 and 1320 and one end portion of the second metal layer 1122 located on the rear surface of the display 330. The one end portion of the second metal layer 1122 may be detachably fixed to one area of the first housing 310 that is adjacent to the at least one magnet member 1310 and 1320. Accordingly, one end portion of the display 330 may be detachably fixed to the one area of the first housing 310.

Figure 15:
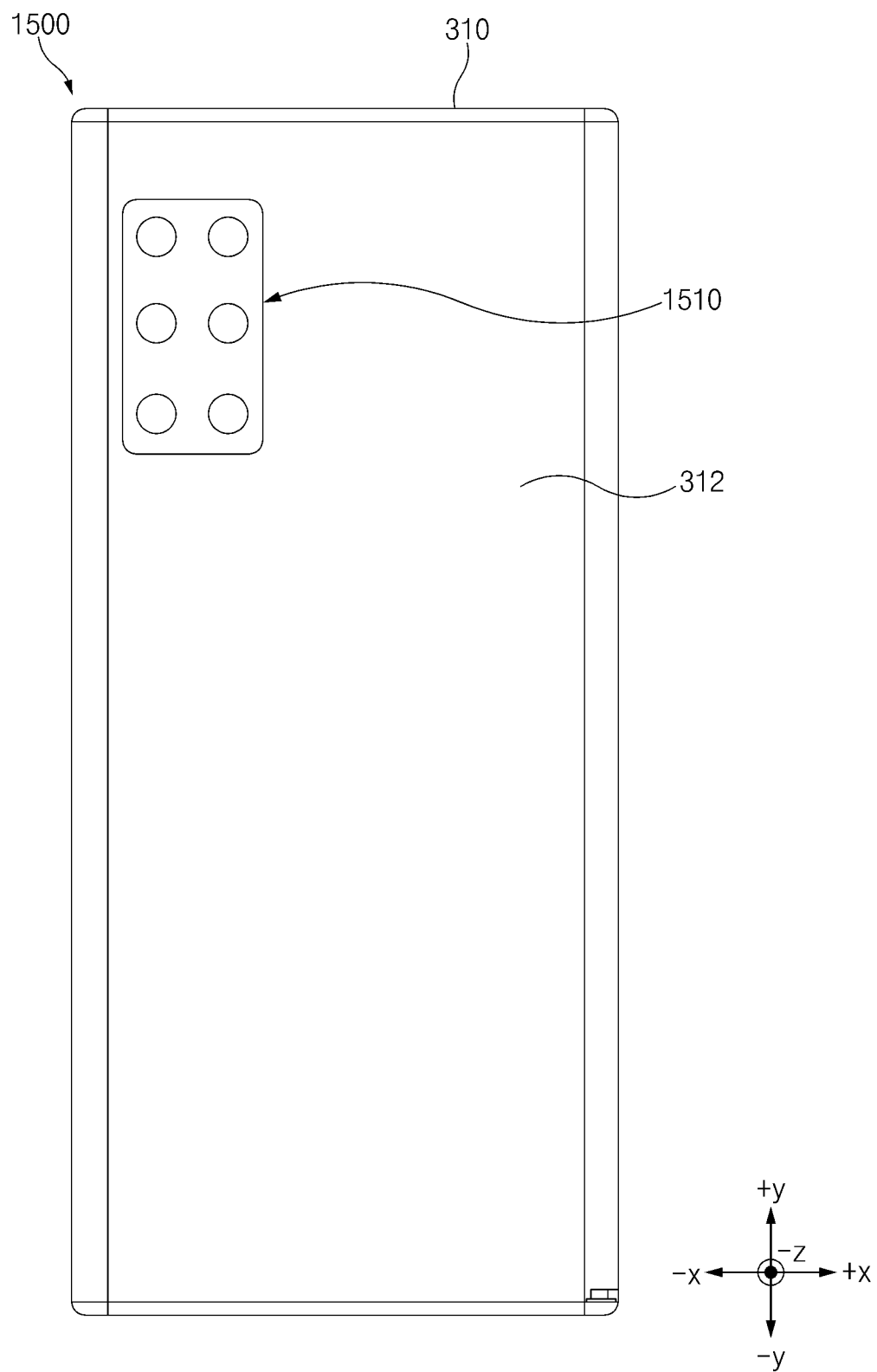
FIG. 15 is a rear view of an electronic device according to an embodiment.
Figure 16:
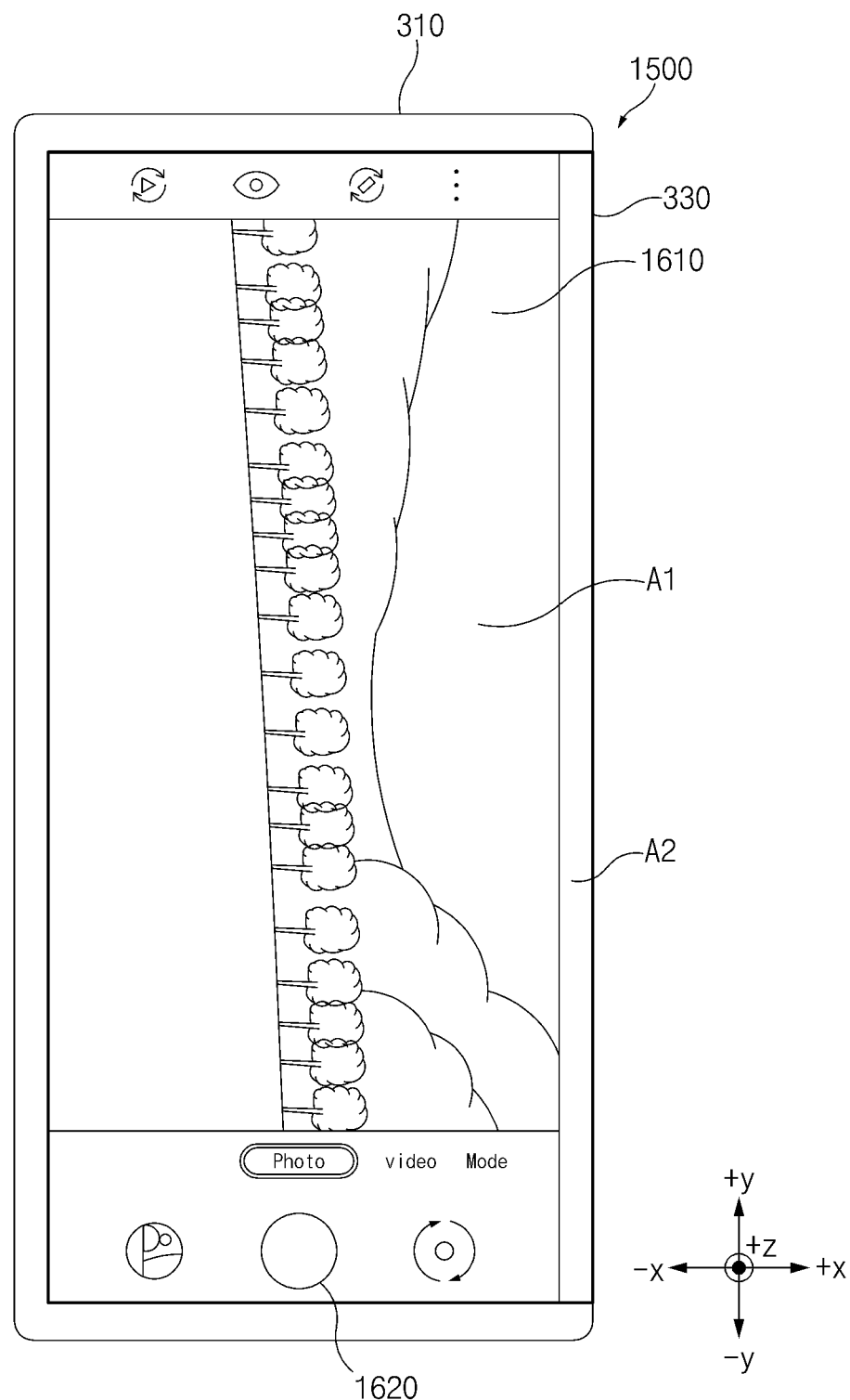
FIG. 16 is a view illustrating the electronic device in a front photography mode.
Figure 17:
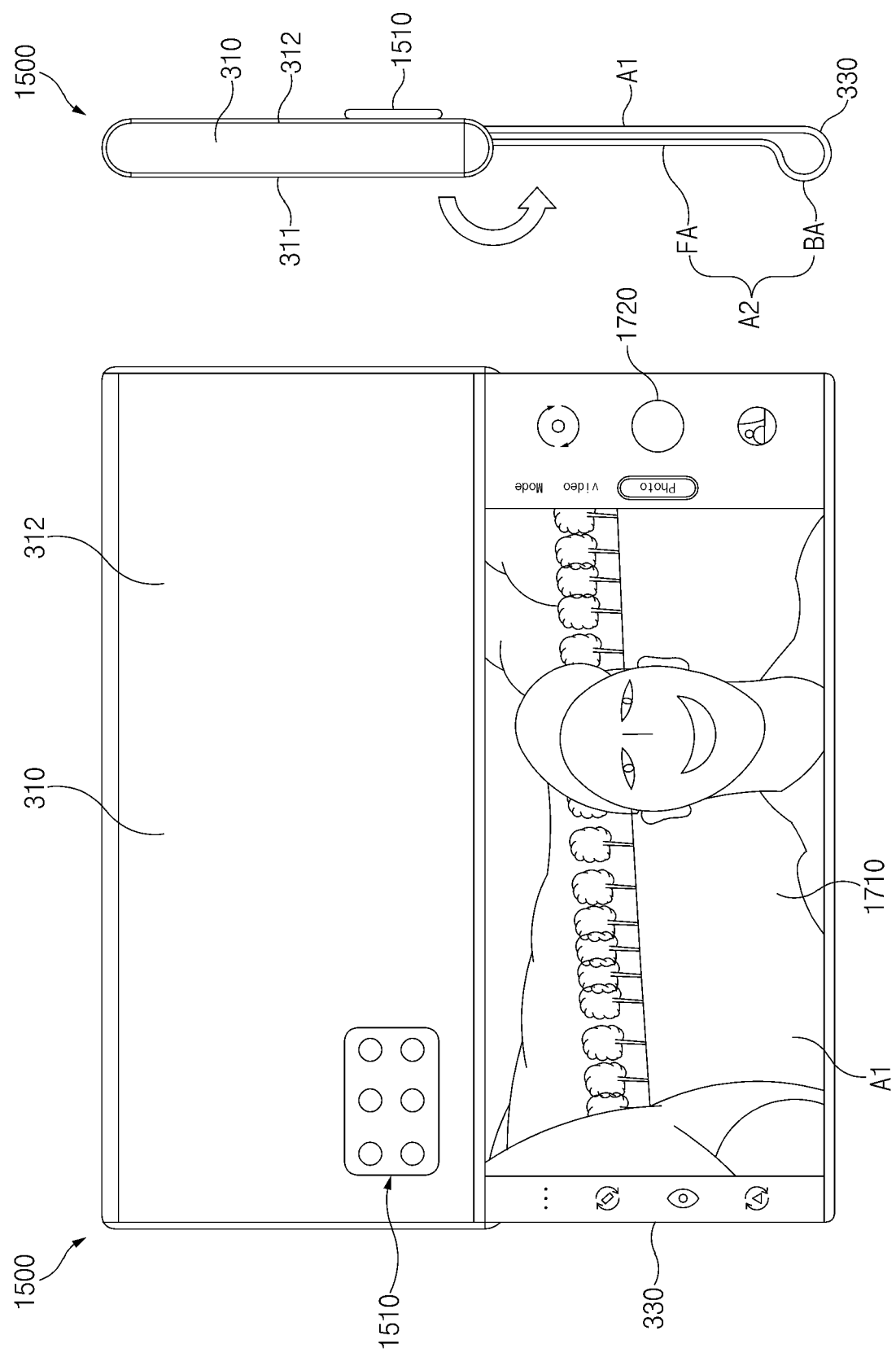
FIG. 17 is a view illustrating the electronic device in a self-photography mode.

Hereinafter, an electronic device 1500 according to an embodiment will be described with reference to FIGS. 15, 16, and 17. FIG. 15 is a rear view of the electronic device 1500 according to an embodiment. FIG. 16 is a view illustrating the electronic device 1500 in a front photography mode. FIG. 17 is a view illustrating the electronic device 1500 in a self-photography mode. Hereinafter, front photography may refer to taking an image in a direction in which a user looks, and self-photography (commonly known as a "selfie") may refer to taking an image in a direction in which the user is located. The electronic device 1500 according to an embodiment may include a first housing 310, a second housing (not illustrated), a display 330, and a camera module 1510 (e.g., the camera module 180 of FIG. 1).

The display 330 may include a first area A1 and a second area A2. The second area A2 may include a flat area FA and a bending area BA located between the flat area FA and the first area A1.

Referring to FIG. 15, the camera module 1510 may be located on a back plate 312 of the first housing 310. The camera module 1510 may include one or more lenses, image sensors, image signal processors, or flashes. The electronic device 1500 according to an embodiment may include a processor (e.g., the processor 120 of FIG. 1) that is operationally connected to the camera module 1510 and the display 330. The processor may display a user interface for photography on the display 330 by using image information obtained from the camera module 1510 and may store image information by taking an image based on a user input.

Referring to FIG. 16, during front photography, the electronic device 1500 according to an embodiment may be in a first state. The second housing may be located in the first housing 310, and the display 330 in a folded state may be disposed on one surface (e.g., a front plate 311 of FIG. 17) of the first housing 310. The first area A1 of the display 330 may be disposed to face the direction opposite to the direction that the camera module 1510 faces. The first area A1 of the display 330 may be disposed to display an image in the front direction of the electronic device 1500, and the camera module 1510 may be located on the rear surface of the electronic device 1500 and may take an image of an object located in the rear direction of the electronic device 1500.

During front photography, based on execution of an application (e.g., a camera application) related to photography, the electronic device 1500 may display a user interface 1610 and 1620 for photography on the first area A1 of the display 330. For example, the electronic device 1500 may obtain, through the camera module 1510, the image 1610 of at least one object located in the rear direction of the first area A1 and may display the image 1610 on the first area A1 of the display 330. The electronic device 1500 may display, on the first area A1 of the display 330, the icon 1620 for receiving a user input for photography.

Referring to FIG. 17, during self-photography, the electronic device 1500 according to an embodiment may be in a fifth state. The second housing may be located in the first housing 310. The display 330 in a folded state may rotate through a specified angle (e.g., 180°) in one direction relative to the first housing 310 and may be disposed side by side with the first housing 310. The first area A1 of the display 330 may be disposed to face the same direction as the camera module 1510. For example, the angle between the first area A1 of the display 330 and the back plate 312 of the first housing 310 may be 180°. The bending area BA of the display 330 may be curved such that that the flat area FA of the second area A2 is located on the rear surface of the first area A1 of the display 330 to overlap the first area A1 in one direction. Unlike that illustrated in FIG. 17, the display 330 may be in an unfolded state.

During self-photography, based on execution of an application (e.g., a camera application) related to photography, the electronic device 1500 may display a user interface 1710 and 1720 for photography on the first area A1 of the display 330. For example, the electronic device 1500 may obtain, through the camera module 1510, the image 1710 of at least one object located in the direction of the display surface of the first area A1 and may display the image 1710 on the first area A1 of the display 330. The electronic device 1500 may display, on the first area A1 of the display 330, the icon 1720 for receiving a user input for photography.

In certain embodiments, the electronic device 1800 can accommodate a stylus pen 1810. A holder member 1950 can be disposed under the bending area BA. One of the lateral portions, e.g., lateral portion 314, can have a hole. When the electronic device 1800 is in the first state, the hold in the holder member 1950 aligns with the hole in the lateral portion 314 to receive the stylus pen 1810.

Figure 18:
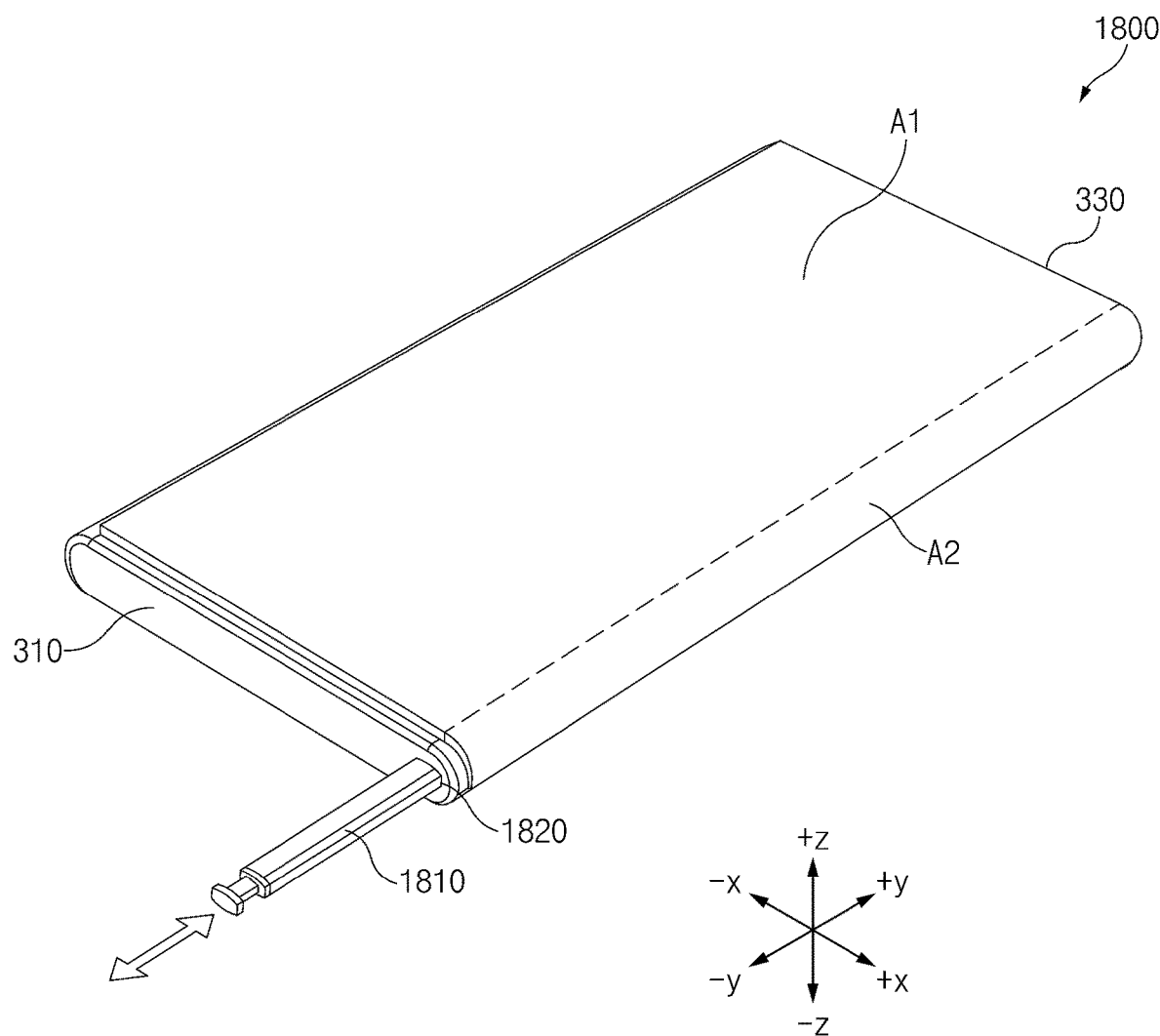
FIG. 18 is a perspective view illustrating an electronic device according to an embodiment.
Figure 19:
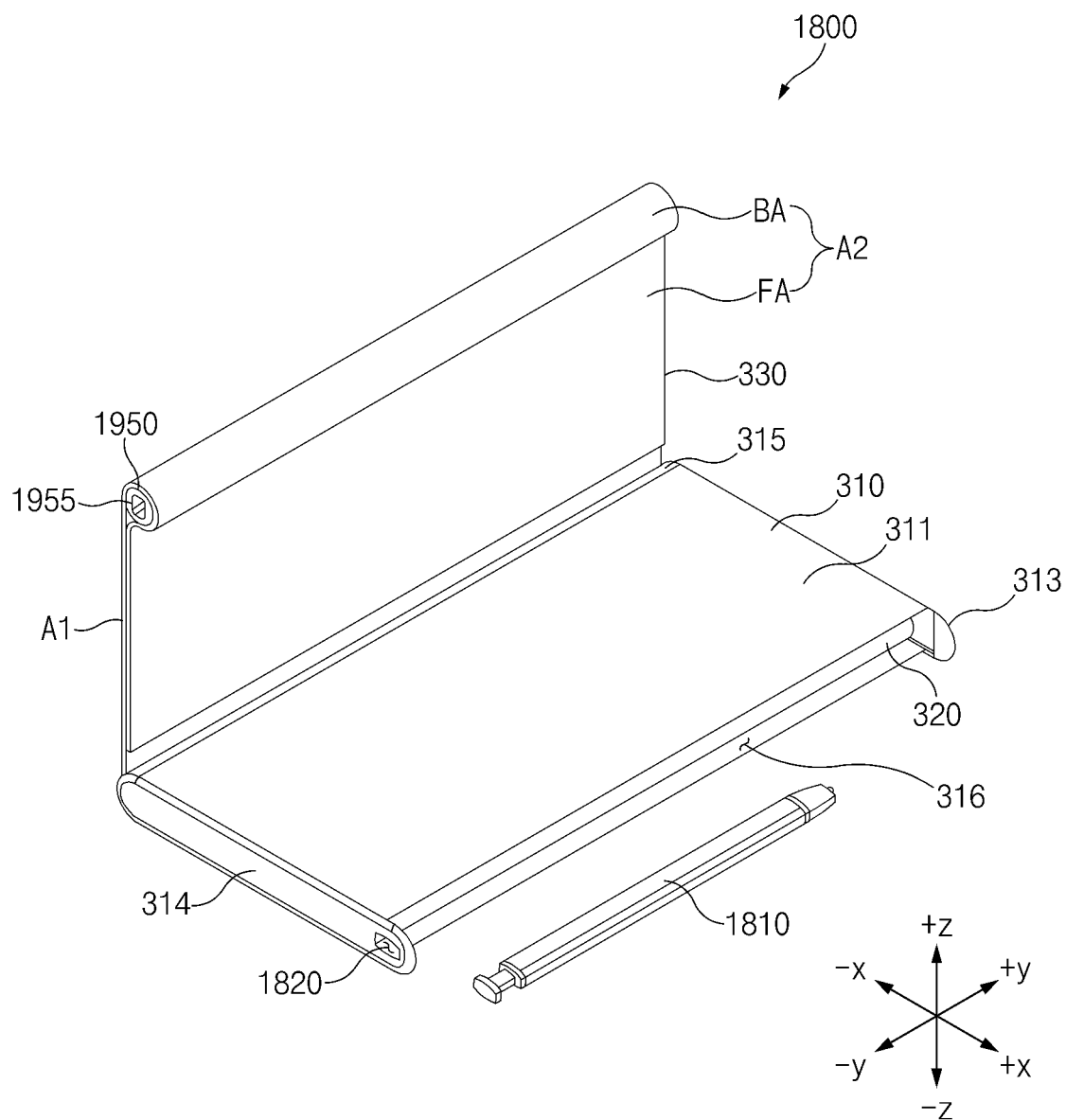
FIG. 19 is a perspective view illustrating one state of the electronic device according to an embodiment.
Figure 20:
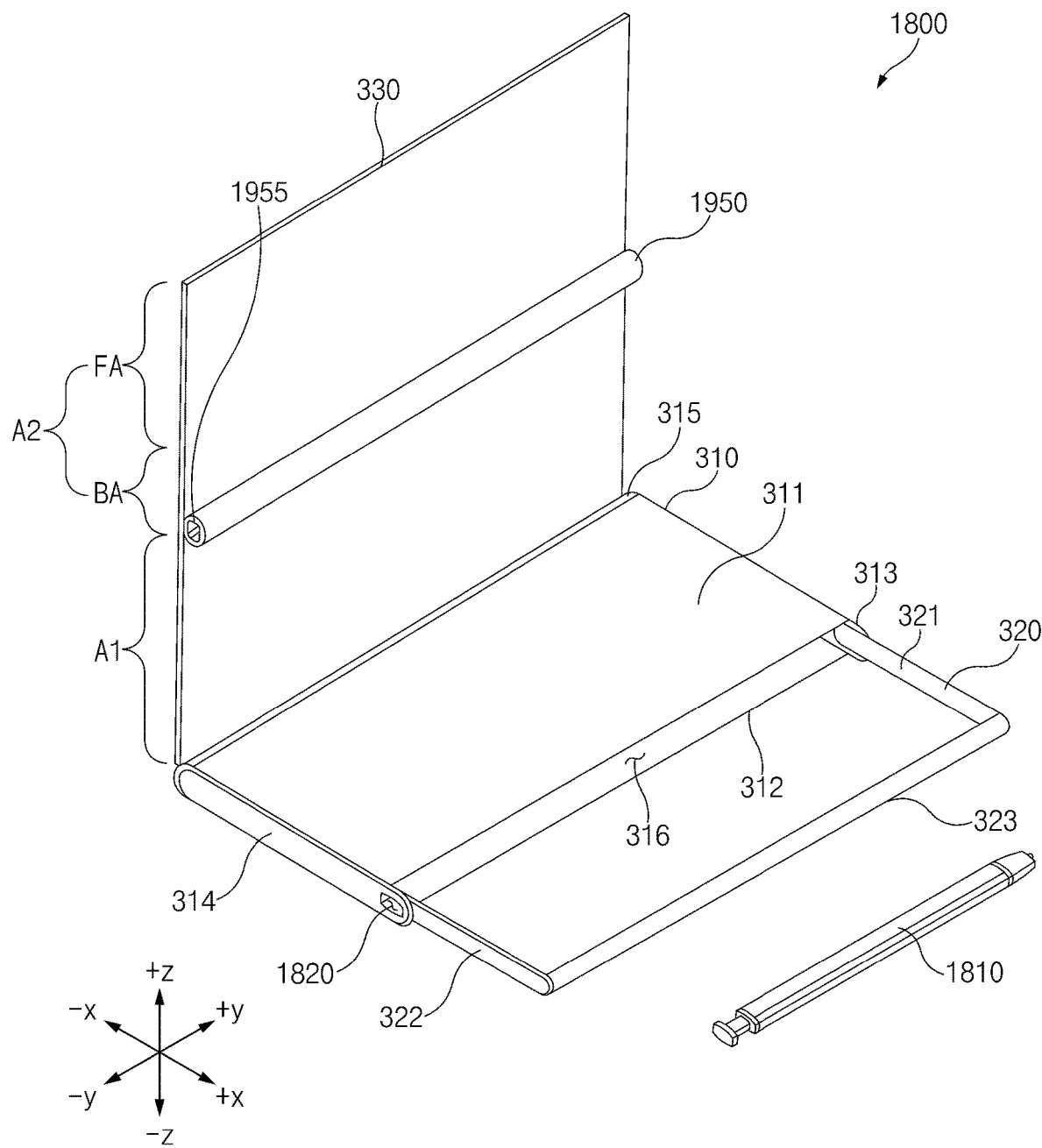
FIG. 20 is a perspective view illustrating another state of the electronic device according to an embodiment.

Hereinafter, an electronic device 1800 according to an embodiment will be described with reference to FIGS. 18, 19, and 20. FIG. 18 is a perspective view illustrating the electronic device according to an embodiment. FIG. 19 is a perspective view illustrating one state of the electronic device according to an embodiment. FIG. 20 is a perspective view illustrating another state of the electronic device according to an embodiment.

The electronic device 1800 according to an embodiment may include a first housing 310, a second housing 320, a display 330, a sensing layer (not illustrated), a holder member 1950, and a stylus pen 1810.

The first housing 310 may include a front plate 311, a back plate 312, lateral portions 313, 314, and 315, an opening 316, and a pen hole 1820. The lateral portions 313, 314, and 315 may include a first side cover 313, a second side cover 314, and a third side cover 315. The pen hole 1820 may be located in one area of the lateral portions 313, 314, and 315 and may be aligned with a storage part 1955 of the holder member 1950.

The second housing 320 may include a first support part 321, a second support part 322, and a third support part 323.

The display 330 may include a first area A1 and a second area A2. The second area A2 may include a flat area FA and a bending area BA located between the flat area FA and the first area A1.

The sensing layer may sense access or touch of the stylus pen 1810. The sensing layer may be located on the entire area of the first area A1 and the second area A2 of the display 330. For example, the sensing layer may be located on the rear surface of the display 330. In another example, the sensing layer may be included in the display 330.

The holder member 1950 may include the storage part 1955 in which the stylus pen 1810 is stored. The holder member 1950 may be located on the rear surface of the bending area BA of the display 330. The holder member 1950 may extend in one direction (e.g., the +y/−y direction) on the rear surface of the bending area BA. The outside of the holder member 1950 may be surrounded by the bending area BA of the display 330 in the state in which the display 330 is folded.

In a first state of the electronic device 1800, the stylus pen 1810 may be inserted into, or withdrawn from, the storage part 1955 of the holder member 1950 through the pen hole 1820 of the first housing 310.

Figure 21:
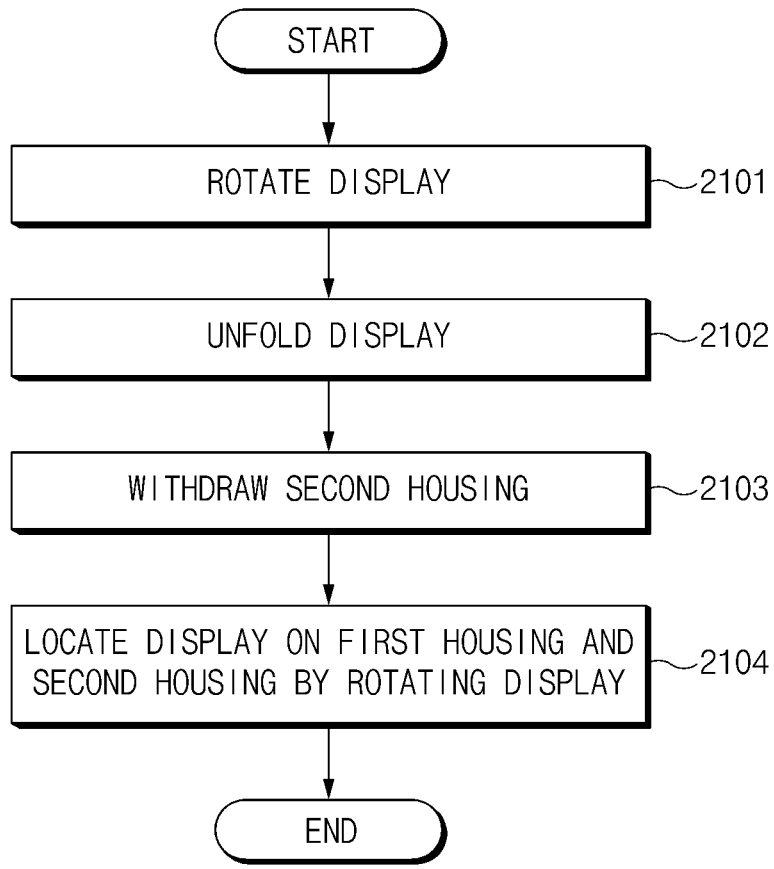
FIG. 21 is a flowchart illustrating an operation in which an electronic device is changed from a first state to a second state according to an embodiment.

Hereinafter, an operation configuration of an electronic device according to an embodiment will be described with reference to FIG. 21. FIG. 21 is a flowchart illustrating an operation in which the electronic device is changed from a first state to a second state according to an embodiment. In the first state of the electronic device, a display in a folded state may be disposed on a first housing, and a second housing may be located in the first housing. In the second state of the electronic device, the second housing may be withdrawn from the first housing, and the display may be disposed on the first housing and the second housing in an unfolded state.

In operation 2101, the electronic device according to an embodiment may rotate the display. The display may be rotatably fastened to one side of the first housing. The display in a folded state may rotate in one direction relative to the first housing. The display in the folded state may be erected while forming a specified angle with respect to the first housing.

In operation 2102, the electronic device according to an embodiment may unfold the display. The display may be unfolded while forming a specified angle with respect to the first housing.

In operation 2103, the electronic device according to an embodiment may withdraw the second housing from the first housing to the outside. The second housing may slide out of the first housing to move outside the first housing.

In operation 2104, the electronic device according to an embodiment may rotate the display in another direction to locate the display on the first housing and the second housing. The display may be supported by the first housing and the second housing in the unfolded state.

An electronic device according to an embodiment may include a first housing (e.g., the first housing 310 of FIG. 8), a second housing (e.g., the second housing 320 of FIG. 8) slidably coupled to the first housing and configured to slide out in a first direction, and a display (e.g., the display 330 of FIG. 8) including a first area (e.g., the first area A1 of FIG. 8) having one end rotatably coupled to one side of the first housing and rotatable about the one side and a second area (e.g., the second area A2 of FIG. 8) adjacent to an opposite end of the first area, wherein the first area has a display surface and a rear surface opposite of the display surface, and wherein the second area has a display surface that is adjacent to display surface of the first area, and a rear surface that is adjacent to the rear surface of the first area; In a first state, the second housing may be located inside the first housing, at least a portion of a rear surface of the second area faces the rear surface of the first area, the first area of the display is disposed on one surface of the first housing, and the first area may be visually exposed. In a second state, the display may be unfolded such that the display surface of the first area and the display surface of the second area are visually exposed, and at least part of the second housing may be withdrawn from the first housing and disposed under the rear surface of the second area.

The second area of the display may include a flat area (e.g., the flat area FA of FIG. 8) and a bending area (e.g., the bending area BA of FIG. 8) that is located between the first area and the flat area and that is folded or unfolded, and in the first state, the flat area may be disposed under the rear surface of the first area.

The bending area may include a first bending area (e.g., the first bending area BA1 of FIG. 7) that is adjacent to the first area and that is curved in one direction and a second bending area (e.g., the second bending area BA2 of FIG. 7) that is located between the first bending area and the flat area and that is curved in another direction.

In the folded state of the display, a distance between the highest point and the lowest point of a display surface of the first bending area may be greater than a distance between the display surface of the first area and a display surface of the flat area.

The first housing may include a front plate (e.g., the front plate 311 of FIG. 6) and a back plate (e.g., the back plate 312 of FIG. 6) that face each other in a third direction, a lateral portion (e.g., the lateral portions 313, 314, and 315 of FIG. 6) that surrounds a space between the front plate and the back plate, and an opening (e.g., the opening 316 of FIG. 6) through which the second housing is inserted into, or withdrawn from, the first housing.

In the first state, the flat area of the second area of the display may be disposed between the first area of the display and the front plate of the first housing.

The electronic device according to an embodiment may further include a metal layer (e.g., the metal layer 710 of FIG. 7) located on the rear surface of the display.

The metal layer may include a first metal layer (e.g., the first metal layer 711 of FIG. 7) located under the rear surface of the first area of the display and a second metal layer (e.g., the second metal layer 712 of FIG. 7) located under a rear surface of the flat area of the display.

The electronic device according to an embodiment may further include a fixing member (e.g., the fixing member 1110 of FIG. 11) connected to the second metal layer, and the fixing member may be disposed such that at least one area thereof rotates to cross the bending area on the rear surface of the display.

The electronic device according to an embodiment may further include a magnet member (e.g., the magnet members 1310 and 1320 of FIG. 13) located on one side of the second housing. In a fourth state, the second housing and the magnet member may be disposed in the first housing, and one end portion of the display may be detachably fixed to one area of the first housing adjacent to the magnet member.

The electronic device according to an embodiment may further include a camera module (e.g., the camera module 1510 of FIG. 15) located on a rear surface of the first housing.

During self-photography, the display in the folded state may be disposed side by side with the first housing, and the first area may face the same direction as the camera module.

The electronic device according to an embodiment may further include a holder member (e.g., the holder member 1950 of FIG. 19) that is fixed to the rear surface of the display and that has a stylus pen received therein.

The holder member may be located on a rear surface of the bending area of the display.

The metal layer (e.g., the metal layer 910 of FIG. 9) may include a plurality of slits (e.g., the plurality of slits 913a of FIG. 9) in an area corresponding to the bending area of the display.

An electronic device according to an embodiment may include a first housing (e.g., the first housing 310 of FIG. 6) including a front plate (e.g., the front plate 311 of FIG. 6), a back plate (e.g., the back plate 312 of FIG. 6), and an opening (e.g., the opening 316 of FIG. 6) located in one side surface of the first housing, a second housing (e.g., the second housing 320 of FIG. 6) that slides in a first direction through the opening of the first housing so as to be at least partially withdrawn from the first housing and slides in a direction opposite to the first direction through the opening of the first housing so as to be inserted into the first housing, and a display (e.g., the display 330 of FIG. 8) including a first area (e.g., the first area A1 of FIG. 8) and a second area (e.g., the second area A2 of FIG. 8) adjacent to each other. The first area may have one end rotatably coupled to one side of the first housing and rotatable about the one side of the first housing and may be disposed on the first housing such that in one state, a rear surface of the first area faces the front plate. The second area may be adjacent to an opposite end of the first area, and one region of the second area may be folded toward a rear surface of the first area such that at least part of the second area is located between the front plate and the first area in the one state, and in another state, the one region may be unfolded such that the second area is disposed on the second housing withdrawn from the first housing.

The second area of the display may include a flat area (e.g., the flat area FA of FIG. 7) and a bending area (e.g., the bending area BA of FIG. 7) that is located between the first area and the flat area and that is folded or unfolded. The bending area may include a first bending area (e.g., the first bending area BA1 of FIG. 7) that is adjacent to the first area and that is curved in one direction and a second bending area (e.g., the second bending area BA2 of FIG. 7) that is located between the first bending area and the flat area and that is curved in another direction.

The first bending area may be curved such that a center of curvature thereof is located on one side of the rear surface of the display, and the second bending area may be curved such that a center of curvature thereof is located on one side of a display surface (e.g., the display surface 331 of FIG. 7) of the display.

In the one state (or a folded state or the first state) of the display, a distance between the highest point and the lowest point of a display surface of the first bending area may be greater than a distance between a display surface of the first area and a display surface of the flat area.

The electronic device according to an embodiment may further include a metal layer (e.g., the metal layer 910 of FIG. 9) located on the rear surface of the display. The metal layer may include a first portion (e.g., the first portion 911 of FIG. 9) located on the rear surface of the first area of the display, a second portion (e.g., the second portion 912 of FIG. 9) located on a rear surface of the flat area of the display, and a third portion (e.g., the third portion 913 of FIG. 9) located on a rear surface of the bending area of the display, and the third portion may include a plurality of slits (e.g., the plurality of slits 913a of FIG. 9).

An electronic device according to certain embodiments disclosed herein may include devices of various forms. The electronic devices, for example, may include a portable communication device (e.g., a smart phone), a computer device, a portable multimedia device, a portable medical device, a camera, a wearable device, or a home appliance. An electronic device according to certain embodiments of the disclosure is not limited to the above-mentioned devices.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a first housing;
   a second housing slidably coupled to the first housing and configured to slide out of the first housing in a first direction; and
   a display including a first area having one end rotatably coupled to one side of the first housing and rotatable about the one side and a second area adjacent to an opposite end of the first area, wherein the first area has a display surface and a rear surface opposite of the display surface, and wherein the second area has a display surface that is adjacent to display surface of the first area, and a rear surface that is adjacent to the rear surface of the first area;
   wherein in a first state, the second housing is located inside the first housing, at least a portion of the rear surface of the second area faces the rear surface of the first area, the first area of the display is disposed on one surface of the first housing, and the display surface of the first area is visually exposed, and
   wherein in a second state, the display is unfolded such that the display surface of the first area and the display surface of the second area are visually exposed, and at least part of the second housing is withdrawn from the first housing and disposed under the rear surface of the second area.

2. The electronic device of claim 1, wherein the second area of the display includes:
   a flat area; and
   a bending area located between the first area and the flat area and configured to be folded or unfolded, and
   wherein in the first state, the flat area is disposed under the rear surface of the first area.

3. The electronic device of claim 2, wherein the bending area includes:
   a first bending area adjacent to the first area and configured to be curved in one direction; and
   a second bending area located between the first bending area and the flat area and configured to be curved in another direction.

4. The electronic device of claim 3, wherein in the first state of the display, a distance between the highest point and the lowest point of a display surface of the first bending area is greater than a distance between the display surface of the first area and the display surface of the flat area.

5. The electronic device of claim 2, wherein the first housing includes:
   a front plate and a back plate configured to face each other in a third direction;
   a lateral portion configured to surround a space between the front plate and the back plate; and
   an opening through which the second housing is inserted into, or withdrawn from, the first housing.

6. The electronic device of claim 5, wherein in the first state, the flat area of the second area of the display is disposed between the first area of the display and the front plate of the first housing.

7. The electronic device of claim 2, further comprising:
   a metal layer located on the rear surface of the display.

8. The electronic device of claim 7, wherein the metal layer includes:
   a first metal layer located under the rear surface of the first area of the display; and
   a second metal layer located under a rear surface of the flat area of the display.

9. The electronic device of claim 8, further comprising:
   a fixing member connected to the second metal layer,
   wherein the fixing member is disposed such that at least one area thereof rotates to cross the bending area on the rear surface of the display.

10. The electronic device of claim 7, further comprising:
    a magnet member located on one side of the second housing,
    wherein in a fourth state, the second housing and the magnet member are disposed in the first housing, and one end portion of the display is detachably fixed to one area of the first housing adjacent to the magnet member.

11. The electronic device of claim 7, wherein the metal layer includes a plurality of slits in an area corresponding to the bending area of the display.

12. The electronic device of claim 2, further comprising:
    a camera module located on a rear surface of the first housing.

13. The electronic device of claim 12, wherein the display in the first state is configured to be adjacent with the first housing, and the first area faces the same direction as the camera module.

14. The electronic device of claim 2, further comprising:
    a holder member fixed to the rear surface of the display, the holder member having a stylus pen received therein.

15. The electronic device of claim 14, wherein the holder member is located on a rear surface of the bending area of the display.

16. An electronic device comprising:
    a first housing including a front plate, a back plate, and an opening located in one side surface of the first housing;
    a second housing configured to slide in a first direction through the opening of the first housing so as to be at least partially withdrawn from the first housing and configured to slide in a direction opposite to the first direction through the opening of the first housing so as to be inserted into the first housing; and
    a display including a first area and a second area adjacent to each other,
    wherein the first area has one end rotatably coupled to one side of the first housing and rotatable about the one side of the first housing, and configured to be disposed on the first housing in one state, such that a rear surface of the first area faces the front plate, and wherein the second area is adjacent to an opposite end of the first area, and one region of the second area is configured fold toward a rear surface of the first area such that at least part of the second area is located between the front plate and the first area in the one state, and in another state the one region is configured to unfold such that the second area is disposed on the second housing, wherein the second housing is withdrawn from the first housing.

17. The electronic device of claim 16, wherein the second area of the display includes:
   a flat area; and
   a bending area located between the first area and the flat area and configured to be folded or unfolded, and
   wherein the bending area includes:
   a first bending area adjacent to the first area and configured to be curved in one direction; and
   a second bending area located between the first bending area and the flat area and configured to be curved in another direction.

18. The electronic device of claim 17, wherein the first bending area is curved such that a center of curvature thereof is located on one side of the rear surface of the display, and
   wherein the second bending area is curved such that a center of curvature thereof is located on one side of a display surface of the display.

19. The electronic device of claim 18, wherein in the one state, a distance between the highest point and the lowest point of a display surface of the first bending area is greater than a distance between a display surface of the first area and a display surface of the flat area.

20. The electronic device of claim 19, further comprising:
   a metal layer located on the rear surface of the display,
   wherein the metal layer includes:
   a first portion located on the rear surface of the first area of the display;
   a second portion located on a rear surface of the flat area of the display; and
   a third portion located on a rear surface of the bending area of the display, and
   wherein the third portion includes a plurality of slits.

* * * * *